United States Patent
Hayes et al.

(10) Patent No.: US 9,877,270 B2
(45) Date of Patent: Jan. 23, 2018

(54) METHODS AND COMMUNICATION DEVICES FOR PERFORMING CELL SEARCH AND DETECTION

(71) Applicant: Intel IP Corporation, Santa Clara, CA (US)

(72) Inventors: Matthew Hayes, Radebeul (DE); Tianyan Pu, Santa Clara, CA (US); Pouyan Parvazi, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/079,119

(22) Filed: Mar. 24, 2016

(65) Prior Publication Data
US 2017/0280374 A1 Sep. 28, 2017

(51) Int. Cl.
*H04W 4/00* (2009.01)
*H04W 48/14* (2009.01)
*H04W 48/16* (2009.01)
*H04W 56/00* (2009.01)

(52) U.S. Cl.
CPC ........... *H04W 48/14* (2013.01); *H04W 48/16* (2013.01); *H04W 56/0015* (2013.01); *H04W 4/00* (2013.01)

(58) Field of Classification Search
CPC . H04W 48/14; H04W 48/16; H04W 56/0015; H04W 4/00
USPC .................................................. 455/434, 436
See application file for complete search history.

(56) References Cited

U.S. PATENT DOCUMENTS

| 8,301,145 | B2 | 10/2012 | Deivasigamani et al. |
| 2009/0323629 | A1* | 12/2009 | Lindoff ............... H04B 7/2681 370/330 |
| 2010/0029274 | A1 | 4/2010 | Deshpande et al. |
| 2012/0135731 | A1 | 5/2012 | Rangaiah et al. |
| 2013/0143556 | A1* | 6/2013 | Axmon ............... H04J 11/0073 455/434 |
| 2013/0188624 | A1* | 7/2013 | Lee ....................... H04W 24/02 370/338 |

(Continued)

OTHER PUBLICATIONS

3GPP TS 36.211 V125.0, 3rd Generation Partnership Project, Technical Specification Group Radio Access Network, Evolved Universal Terrestrial Radio Access (E-UTRA), Physical channels and modulation; Section 6.11, Mar. 2015, pp. 111-114, Release 12, 3GPP, Valbonne, France.

(Continued)

*Primary Examiner* — Mong-Thuy Tran
(74) *Attorney, Agent, or Firm* — Viering, Jentschura & Partner mbB

(57) ABSTRACT

A mobile communication device may include a cell search circuit configured to process a first block of signal waveform data to extract a first discrete parameter set, wherein the first discrete parameter set identifies one or more first potential cells present in the first block of signal waveform data, process the second block of signal waveform data to extract a second discrete parameter set, wherein the second discrete parameter set identifies one or more second potential cells present in the second block of signal waveform data, and compare the first discrete parameter set and the second discrete parameter set to identify one or more matching cells, and an RF transceiver configured to transmit or receive radio signals based on the identification of the one or more matching cells.

18 Claims, 9 Drawing Sheets

(56) References Cited

U.S. PATENT DOCUMENTS

| | | | |
|---|---|---|---|
| 2015/0011207 A1* | 1/2015 | Pu | H04W 48/16 |
| | | | 455/434 |
| 2015/0092708 A1* | 4/2015 | Su | H04W 76/026 |
| | | | 370/329 |
| 2015/0173118 A1* | 6/2015 | Gholmieh | H04W 76/02 |
| | | | 455/436 |
| 2015/0230276 A1* | 8/2015 | Jung | H04W 72/06 |
| | | | 370/229 |
| 2015/0358894 A1 | 10/2015 | Berggren et al. | |
| 2016/0021629 A1 | 1/2016 | Jang et al. | |
| 2016/0066255 A1* | 3/2016 | Marinier | H04W 48/16 |
| | | | 370/350 |
| 2016/0100373 A1* | 4/2016 | Chen | H04L 27/2613 |
| | | | 370/350 |
| 2016/0227462 A1* | 8/2016 | Axmon | H04W 36/32 |

OTHER PUBLICATIONS

PCT International Search Report in parallel international application No. PCT/US2017/017857 dated May 24, 2017; 18 pages.

* cited by examiner

Time

{81,14}  {1,134}  {17,135}  {87,1321}  {45,1321} results

{58,15456}  {67,10354}  {501,14}  {107,1550}  {91,1648}  {189,1350}

{10,13}  {59,13454}  {267,30001}  {12,101}  {62,16448}  {503,101}

{126,54}  {101,13524}  {395,13674}  {139,156}  {305,4344}  {67,1354}

METHODS AND COMMUNICATION DEVICES FOR PERFORMING CELL SEARCH AND DETECTION

TECHNICAL FIELD

Various embodiments relate generally to methods and communication devices for performing cell search and detection.

BACKGROUND

Mobile cell search procedures may rely on detection of synchronization sequences in downlink signals to both identify and obtain synchronization with proximate cells. For example, in a Long Term Evolution (LTE) context as specified by the 3$^{rd}$ Generation Partnership Project (3GPP) a mobile terminal may need to detect and identify Primary Synchronization Signal (PSS) and Secondary Synchronization Signal (SSS) sequences in downlink signals received from nearby cells. A mobile terminal may subsequently be able to obtain cell parameters such as cell identity (Physical Cell Identity, PCI), cyclic prefix length (CP, extended or normal), duplex mode (Time Division Duplexing, TDD, or Frequency Division Duplexing, FDD), and timing synchronization based on identification of such synchronization sequences. Mobile terminals may then proceed to utilize these cell parameters in essential mobility procedures, such as measurement reporting, network selection, cell selection and reselection, and handover.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows exemplary contents of a cell search result database;

DESCRIPTION

Figure 1:
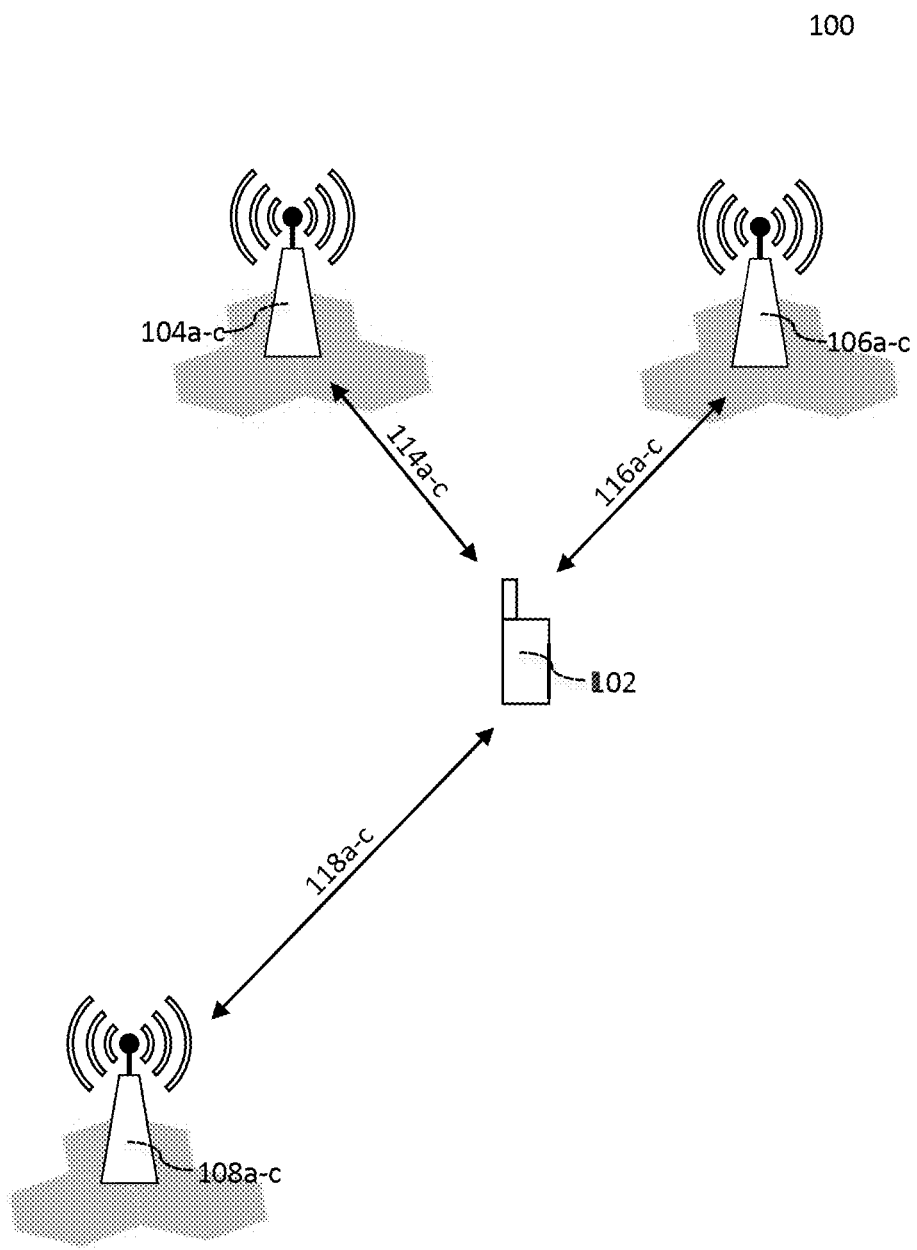
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers to more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network. Unless explicitly specified, the term "transmit" encompasses both direct and indirect transmission. Similarly, the term "receive" encompasses both direct and indirect reception unless explicitly specified.

Cell search may be a vital first step in various cellular mobility procedures including measurement reporting, network selection, cell selection/reselection, and handover. For cell search in an LTE context, a mobile terminal may receive downlink signals on one or more frequency layers and process the received downlink signals to identify the presence of synchronization sequences such as PSS and SSS sequences transmitted by nearby cells. Mobile terminals may then identify and establish synchronization with detectable cells by identifying the PSS and SSS sequences.

As each cell may not align its transmission schedule in time with other cells, a mobile terminal may not have prior knowledge of the timing locations of synchronization sequences transmitted by proximate cells. A mobile terminal may thus need to capture a block of downlink signal data that has a duration at least equal to the synchronization sequence transmission period, e.g. 5 ms (a single half-frame) for PSS and SSS in an LTE context and subsequently process the 5 ms block of downlink data to detect the presence of any synchronization sequences. The mobile terminal may then identify proximate cells based on the detected synchronization sequences.

Specifically, a mobile terminal may calculate the cross-correlation in the time domain between a captured search probe and each of a predefined set of possible PSS sequences to identify potential timing locations of PSS sequences in the search probe. The mobile terminal may then use identified potential PSS timing locations for symbol timing to convert the captured search probe into the frequency domain and subsequently perform frequency-domain cross-correlation with each of a predefined set of possible SSS sequences to identify a transmitted SSS in the captured search probe. Depending on the results of the PSS and SSS detection, a mobile terminal will be able to obtain an initial list of detected cells according to the identified PSS and SSS sequences.

While a mobile terminal may be able to obtain an initial list of detected cells from only a single 5 ms search probe of downlink data, reliance on a single search probe may degrade the accuracy of search results in the event of noise and other random channel variations. A mobile terminal may thus improve detection sensitivity by capturing multiple search probes (i.e. block of received data sufficient for search or detection) of downlink data and "combining" results of the search probes to obtain more accurate search results. For example, a mobile terminal may obtain two or more search probes (5 ms block of downlink data in an LTE context), perform PSS cross-correlation on each search probe to obtain a corresponding set of cross-correlation functions, and accumulate or average the obtained cross-correlation functions. The resulting accumulated cross-correlation functions may be more resistant to channel variations, and accordingly may provide a more accurate basis for which to identify PSS timing locations. As the mobile terminal may not be able to apply knowledge of the channel, such may be referred to as "non-coherent" detection.

A mobile terminal may then subsequently apply the PSS detection results for symbol timing purposes and perform coherent averaging of SSS detection results (frequency-domain cross-correlation as introduced above) after channel estimation and correction for each search probe. Through such coherent and non-coherent averaging of PSS and SSS detection results, a mobile terminal may improve search accuracy and thus reduce the likelihood of false positives in which noise is mistaken for a valid cell, i.e. a "false" or "ghost" cell and of potentially missing detection of a valid cell, in particular in poor Signal-to-Noise Ratio (SNR) conditions.

However, non-coherent PSS detection as detailed above may require a mobile terminal to store both PSS (time-domain) and SSS (frequency-domain) cross-correlation results over extended periods of time. For example, a mobile terminal may obtain PSS cross-correlation results for a first search probe and subsequently store the PSS cross-correlation results (as e.g. the magnitudes of the complex digital samples produced via cross-correlation) until the next search probe when non-coherent accumulation or averaging may be applied. A mobile terminal may thus need to store digital samples representing the PSS cross-correlation signal waveform for the entire 5 ms search probe, which may require substantial memory capacity. The mobile terminal may additionally store the SSS cross-correlation signal results for coherent accumulation or averaging of SSS cross-correlation results (after channel estimation and correction) with SSS cross-correlation results of a subsequent search probe. Such cell detection signal waveform data (PSS and SSS cross-correlation waveforms) may present a substantial amount of data for a mobile terminal to store during cell search. Furthermore, due to scheduling constraints a mobile terminal may not be able to capture each of the search probes in a contiguous manner, and accordingly may need to retain cell detection signal waveform data for extended periods of time before accumulating it with cell detection signal waveform data, i.e. PSS and SSS cross-correlation waveforms, from the next target search probe. For example, in a radio connected state a mobile terminal may only be allocated a continuous 6 ms window every 40 or 80 ms to perform inter-frequency cell search (or radio measurement). Accordingly, a mobile terminal may only be able to capture a search probe (at least e.g. a 5 ms block of downlink data for LTE) every 40 or 80 ms and thus may need to store cell detection signal waveform data for a given search probe for at least 40 ms before the cell detection signal waveform data can be combined with cell detection signal waveform data, e.g. via non-coherent accumulation/averaging for PSS cross-correlation waveforms and coherent accumulation/averaging for SSS cross-correlation waveforms.

In addition, in many cases a mobile terminal may target more than one frequency layers (i.e. carrier frequencies) for cell search, and accordingly may need to perform PSS and SSS detection on each frequency layer. Combined with the aforementioned scheduling constraints, a mobile terminal may need to capture multiple search probes and produce the resulting PSS and SSS cell detection signal waveform data for each of a plurality of frequency layers while only being able to receive a single search probe for a single frequency layer every 40 (or 80) ms. Mobile terminals performing cell search using multiple search probes may thus need to store cell detection signal waveform data for each targeted frequency layer. A mobile terminal may thus need to utilize excessive memory storage to store such "soft data", i.e. digital samples representing a signal waveform. Such soft data may include either raw data, e.g. digital samples of a search probe, or processed data, e.g. digital samples of a cross-correlation function waveform.

In order to reduce the memory requirements of cell search, a mobile terminal may instead extract "hard data" from search probes, i.e. data that expresses a field, parameter, characteristic or other discrete content of a signal. Hard data may thus be viewed as a "parameterization" of soft data, where certain characteristics of the soft data are extracted and expressed as discrete parameters. As hard data merely expresses a discrete characteristic of a signal compared to a expressing an entire signal waveform in the case of soft data (e.g. digital samples of a signal), a mobile terminal may substantially reduce memory requirements by extracting hard data from the soft data of each search probe and subsequently storing only the hard data. In the context of cell search, hard data for a given search probe may include discrete parameters that describe each detected cell in the given search probe, such as cell identity information (e.g. Physical Cell Identity, (PCI)), cell synchronization information (e.g. PSS and/or SSS timing reference), and cell transmission parameters (e.g. duplex mode and cyclic prefix (CP) length). Accordingly, retaining only such abbreviated hard data while discarding soft data (e.g. from a signal buffer) for each search probe may allow for a mobile terminal to significantly reduce memory usage compared to storing soft data over multiple search probes. As hard data store requires appreciably less memory than soft data storage, a mobile terminal may be easily store hard data from multiple search probes without using excessive memory. The mobile terminal may then subsequently apply the hard data to filter out the aforementioned "ghost" cells (false positives) and positively identify real cells, such as by comparing the hard data from each search probe to identify real cells by detecting matches in the hard data.

As introduced above, a mobile terminal may perform cell search in order to detect and identify proximate cells. FIG. 1 shows an exemplary scenario in which mobile terminal 102 is located proximate to base stations 104, 106, and 108. Each of base stations 104-108 may be sectorized (e.g. with sectorized antenna systems) and accordingly composed of multiple "sectors" or "cells", such as cells 104a, 104b, and 104c for base station 104, cells 106a, 106b, and 106c for base station 106, and cells 108a, 108b, and 108c for base station 108. The wireless channels 114a-114c, 116a-116c, and 118a-118c may represent the discrete wireless channels between each of respective cells 104a-104c, 106a-106c, and 108a-108c.

Figure 2:
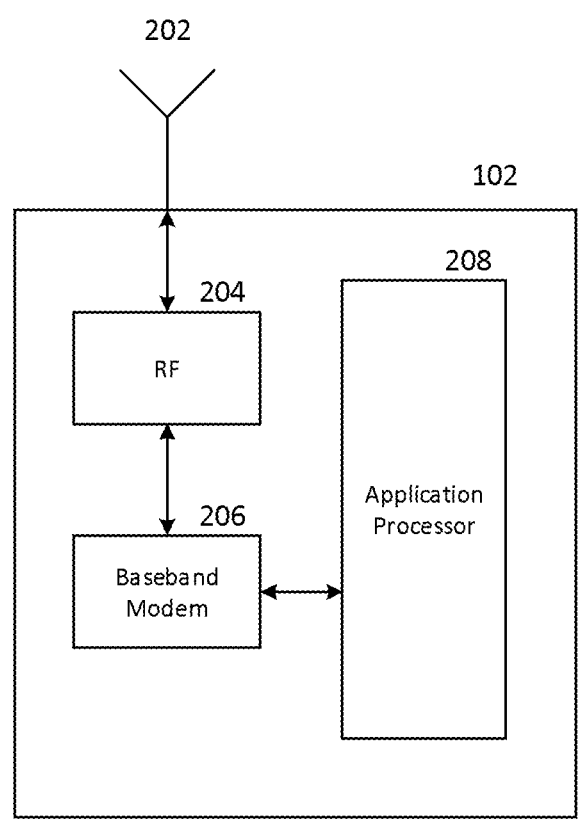
FIG. 2 shows an internal configuration of a mobile terminal device.

FIG. 2 shows an internal configuration of mobile terminal 102. As shown in FIG. 2, mobile terminal 102 may include antenna system 202, RF transceiver 204, baseband modem 206, and application processor 208. Mobile terminal 102 may have one or more additional components not explicitly depicted in FIG. 2, such as additional hardware, software, or firmware elements including processors/microprocessors, controllers/microcontrollers, memory, other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device (s), memory, power supply, external device interface(s), subscriber identify module(s) (SIM) etc.

As will be detailed, in an aspect of the disclosure mobile terminal 102 may be a mobile terminal device including a signal memory, a cell search circuit configured to process a first block of signal waveform data to extract a first discrete parameter set, the first discrete parameter set describing one or more first potential cells present in the first block of signal waveform data, discard the first block of signal waveform data from the signal memory prior to processing a second block of signal waveform data, process the second block of signal waveform data to extract a second discrete parameter set, the second discrete parameter set describing one or more second potential cells present in the second block of signal waveform data, and compare the first discrete parameter set and the second discrete parameter set to identify one or more matching cells, and an RF transceiver configured to transmit or receive radio signals based on the one or more matching cells. In another aspect of the disclosure, mobile terminal 102 may be a mobile terminal device including a signal memory for storing signal data, a shared result database, an RF transceiver, and a cell search circuit configured to sequentially process each of a plurality of signal waveform data blocks to extract a discrete cell parameter set for each of the plurality of signal waveform data blocks and discard each respective signal waveform data block of the plurality signal waveform data blocks from the signal memory after extracting the corresponding discrete cell parameter set, store the discrete parameter cell parameter set for each of the plurality of signal waveform data blocks in a shared result database, and identify one or more matching cells based on the shared result database, the RF transceiver configured to transmit or receive radio signals based on the one or more matching cells.

In an abridged overview of the operation of mobile terminal 102, mobile terminal 102 may be configured to receive and/or transmit wireless signals according to multiple different wireless access protocols or radio access technologies (RATS), including any one or combination of LTE, WLAN, WiFi, UMTS, GSM, Bluetooth, CDMA, Wideband CDMA, etc. The RAT capabilities of mobile terminal 102 may be determined by one or more Subscriber Identity Modules (SIM) included in mobile terminal 102 (not explicitly shown in FIG. 2). It is appreciated that separate components may be provided for each distinct type of compatible wireless signals, such as a dedicated LTE antenna, LTE RF transceiver, and dedicated LTE baseband modem for LTE reception and transmission, a dedicated UMTS antenna, UMTS RF transceiver and UMTS baseband modem, a dedicated WiFi antenna, WiFi RF transceiver, and WiFi baseband modem for WiFI reception and transmission, etc., in which case antenna 202, RF transceiver 204, and baseband modem 206 may each respectively be an antenna system, RF transceiver system, and a baseband modem system composed of the individual dedicated components. Alternatively, one or more components of mobile terminal 102 may be shared between different wireless access protocols, such as e.g. by sharing antenna 202 between multiple different wireless access protocols, e.g. by using a common RF transceiver 204 shared between multiple wireless access protocols, e.g. a common baseband modem 206 shared between multiple wireless access protocols, etc. In an exemplary aspect of disclosure, RF transceiver 204 and/or baseband modem 206 may be operate according to multiple mobile communication access protocols (i.e. "multi-mode"), and thus may be configured to support one or more of LTE, UMTS, and/or GSM access protocols.

Further to the abridged overview of operation of mobile terminal 102, RF transceiver 204 may receive radio frequency wireless signals via antenna 202, which may be implemented as e.g. a single antenna or an antenna array composed of multiple antennas. RF transceiver 204 may include various reception circuitry components, which may include analog circuitry configured to process externally received signals such as e.g. mixing circuitry to convert externally received RF signals to baseband and/or intermediate frequencies. RF transceiver 204 may also include amplification circuitry to amplify externally received signals, such as power amplifiers (PAs) and/or Low Noise Amplifiers (LNAs), although it is appreciated that such components may also be implemented separately. RF transceiver 204 may additionally include various transmission circuitry components configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. Further references herein to reception and/or transmission of wireless signals by mobile terminal 102 may thus be understood as an interaction between antenna 202, RF transceiver 204, and baseband modem 206 as detailed above. Although not explicitly depicted in FIG. 2, RF transceiver 204 may be additionally be connected to application processor 208.

Figure 3:
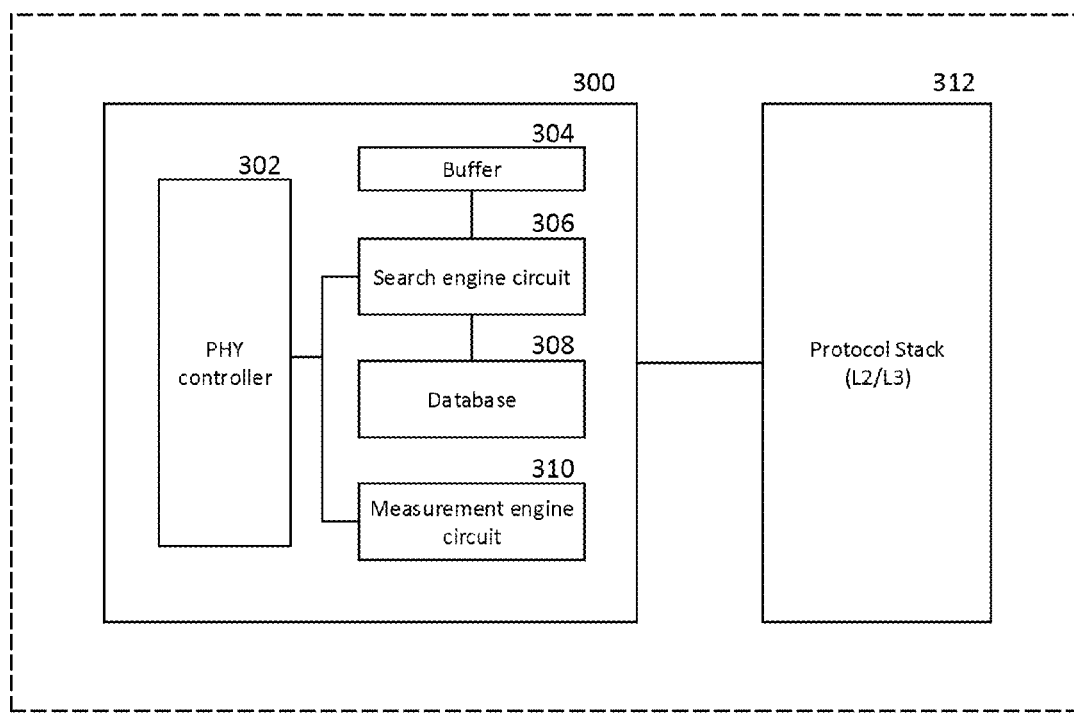
FIG. 3 shows an internal configuration of a baseband modem.

FIG. 3 depicts an internal configuration of baseband modem 206. As shown in FIG. 3, baseband modem 206 may be composed of a physical layer (PHY, Layer 1) subsystem 300 and a protocol stack (Layers 2 and 3) subsystem 312. Although not explicitly shown in FIG. 3, baseband modem 206 may additionally include various additional baseband processing circuitry, such as Analog to Digital Converters (ADCs) and/or Digital to Analog Converters (DACs), modulation/demodulation circuitry, encoding/decoding circuitry, audio codec circuitry, digital signal processing circuitry, etc.

Baseband modem 206 may be responsible for mobile communication functions of mobile terminal 102, and may be configured to operate in conjunction with RF transceiver 204 and antenna system 202 to transmit and receive mobile communication signals in accordance with various mobile communication protocols. Baseband modem 206 may be responsible for various baseband signal processing operations for both uplink and downlink signal data. Accordingly, baseband modem 206 may obtain and buffer baseband downlink and uplink signals and subsequently provide the buffered downlink signals to various internal components of baseband modem 206 for respective processing operations.

PHY subsystem 300 may be configured to perform control and processing of physical layer mobile communication functions, including error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Although not explicitly depicted in FIG. 3, the aforementioned functionality of PHY subsystem 300 may be realized as hardware and/or software (program code executed on a processor) components under the control of PHY controller 302.

PHY controller 302 may be realized as a processor configured to execute physical layer control software and control the various components of PHY subsystem 300 under the direction of the control logic defined therein in order to provide the requisite physical layer functionality to mobile terminal 102. As further detailed below, PHY controller 302 may be configured to control search engine 306 and measurement engine 310 to perform cell search and measurement procedures.

Baseband modem 206 may additionally include protocol stack subsystem 310, which may be responsible for the Layer 2 and Layer 3 functionality of the protocol stack. In an LTE context, protocol stack subsystem 312 may be responsible for Medium Access Control (MAC), Radio Link Control (RLC), Packet Data Convergence Protocol (PDCP), Radio Resource Control (RRC), Non-Access Stratum (NAS), and Internet Protocol (IP) entity processes. Protocol stack subsystem 312 may be realized as a processor configured to execute protocol stack software and control mobile communication operations of mobile terminal 102 under the direction of control logic defined therein. Protocol stack subsystem 312 may interact with PHY subsystem 300, such as via an interface with PHY controller 302, to request physical layer services as specified by the protocol stack control logic including physical layer configuration and radio measurement. Protocol stack subsystem 312 may supply PHY subsystem 300 with downlink transport channel data (MAC data) scheduled for subsequent physical layer processing and transmission by PHY subsystem 300 (via RF transceiver 204 and antenna system 202). PHY subsystem 300 may conversely receive uplink physical channel data via (via RF transceiver 204 and antenna system 202) and perform subsequent physical layer processing on the received uplink physical channel data before providing the uplink physical channel data to protocol stack subsystem 312 as uplink transport channel data (MAC data). Subsequent reference to transmission and reception of signals by mobile terminal 102 may thus be understood as an interaction between antenna system 202, RF transceiver 204, and baseband modem 206 (PHY subsystem 300 and protocol stack subsystem 312) as thus detailed.

Baseband modem 206 may additionally interface with application processor 208, which may be implemented as a Central Processing Unit (CPU) and configured to execute various applications and/or programs of mobile terminal 102, such as e.g. applications corresponding to program code stored in a memory component of mobile terminal 102 (not explicitly shown in FIG. 2). Application processor 208 may be configured to run an operating system (OS) of mobile terminal 102, and may utilize the interface with baseband modem 206 in order to transmit and receive user data such as voice, video, application data, basic Internet/web access data, etc. Application processor 208 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc. Although depicted separately in FIG. 2, part or all of the detailed functionality of baseband modem 206 may be implemented at application processor 208, such as by executing the functionality of baseband modem 206 as software executed by the processor core of application processor 208 (e.g. in particular physical layer subsystem 300 and protocol stack subsystem 310). Such is recognized as providing equivalent functionality and the disclosure is thus not limited to either architecture.

Mobile terminal 102 may transmit and receive data with various network cells, such as e.g. cells 104a-104c, 106a-106c, and 108a-108c, according to the protocol stack and physical layer operations directed by physical layer subsystem 300 and protocol stack subsystem 312. As previously indicated, mobile terminal 102 may need to first detect a given cell via cell search procedures prior to interacting with the cell.

In the exemplary scenario of FIG. 1, each of cells 104a-104c, 106a-106c, and 108a-108c may be transmitting on a given first frequency layer, i.e. may be transmitting on the same carrier frequency. Base stations 104-108 may additionally each have one or more cells transmitting on one or more additional frequency layers (e.g. cells for base station 104, cells for base station 106, and cells for base station 108 may transmit on a second frequency layer), and accordingly the following description focusing on a single frequency layer may analogously apply to one or more additional frequency layers. During a cell search procedure, mobile terminal 102 may desire to identify all detectable cells on one or more target frequency layers, which may include the aforementioned first frequency layer of cells 104a-104c, 106a-106c, and 108a-108c.

Mobile terminal 102 may thus trigger a cell search at a given point in time, which may be e.g. determined based on the mobility environment of mobile terminal 102 as observed by an RRC entity of protocol stack subsystem 312. For example, the RRC entity may determine based on a combination of network instruction and previous radio measurements that radio measurements should be performed as part of cell reselection or handover procedures. Alternatively, mobile terminal 102 may be implementing a power-up procedure (from a device power-off or a sleep state) or may be recovering from an Out Of Coverage (OOC) scenario, and consequently may need to perform network selection (e.g. PLMN selection) and/or cell selection.

The RRC entity may thus request a cell search from PHY controller 302, which may subsequently trigger a cell search at search engine circuit 306. Search engine circuit 306 may be implemented as a hardware and/or software system, and may be configured to receive and process digital signals provided to baseband modem 206 from RF transceiver 204 in order to perform cell search and detection. Physical layer subsystem 300 may receive and store digitized downlink signals (soft data) in buffer 304, which search engine circuit 306 may evaluate to detect cells. Search engine circuit 306 may subsequently report detected cells to PHY controller 302, which PHY controller 302 may proceed to trigger measurement for at measurement engine circuit 310 and/or report to the RRC entity of protocol stack subsystem 310. Search engine circuit 306 thus be configured to receive search probes of downlink signal data (stored in buffer 304) and process the received search probes to detect PSS and SSS sequences from proximate cells.

Figure 4:
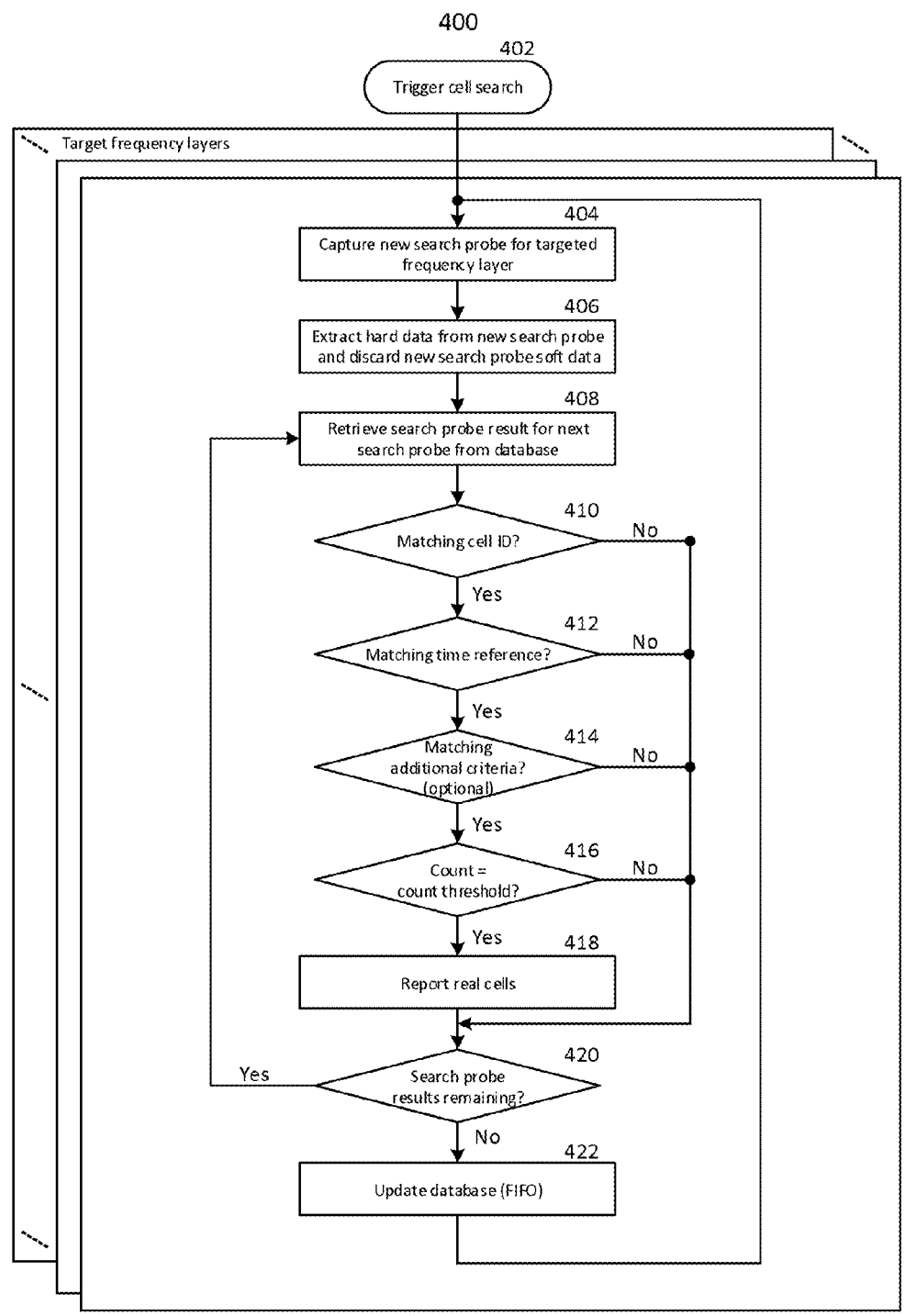
FIG. 4 shows a method of performing cell search and detection.

FIG. 4 shows a decision chart illustrating the cell search procedure as performed by search engine circuit 306. As previously introduced, search engine circuit 306 may be configured to extract hard data for each search result (potential detected cell) of a given search probe (block of downlink signal data, i.e. soft data). Search engine circuit 306 may evaluate multiple search probes for each targeted frequency layer, and accordingly may obtain a set of hard data for each processed search probe. Search engine circuit 306 may store the hard data in a database and subsequently evaluate the database in order to detect "matches" across the processed search probes, such as by identifying search results with matching hard data. Search engine circuit 306 may thus identify matching search results as detected cells, and may subsequently report the detected cells for each targeted frequency layer to PHY controller 302 for further analysis, such as e.g. measurement by measurement engine circuit 310 and potential subsequent reporting to protocol stack subsystem 312 (which may subsequently report detected cells and/or corresponding radio measurements to the network). Search engine circuit 306 may clear buffer 304 after evaluating each search probe, and accordingly may avoid storing soft data over multiple search probes. As search engine circuit 306 may only store hard data from each search probe, search engine circuit 306 may reduce memory.

As shown in FIG. 4, PHY controller 302 may trigger cell search at 402, and may assign search engine circuit 306 with one or more target frequency layers to search. Search engine circuit 306 may subsequently iteratively perform 404-422 for each assigned target frequency layer, which search engine circuit 306 may perform simultaneously (e.g. performing iterations of 404-422 in parallel for each target frequency layer), successively (e.g. performing iterations of 404-422 for a given target frequency layer until completion before proceeding to the next target frequency layer), or "interleaved" (e.g. by iterating through each target frequency layer and performing a set number of iterations of 404-422 for the current target frequency layer before iterating to a subsequent target frequency layer).

Referring to the aforementioned first frequency layer of cells 104a-104c, 106a-106c, and 108a-108c, search engine circuit 306 may begin processing the first frequency layer at 404. Accordingly, search engine circuit 306 may capture a new search probe of downlink signal data for the first frequency layer. For example, search engine circuit 306 may obtain the new search probe of downlink signal data following radio frequency demodulation and digitization and store the new search probe in buffer 304, which may be a memory component configured to hold digital samples. Buffer 304 may thus hold digital downlink samples of the search probe (e.g. 5 ms of downlink soft data, which may be digital samples of the received search probe, digital samples of a cross-correlation waveform, etc.). Search engine circuit 306 may access buffer 304 in order to process the new search probe as part of cell search and detection. Although only one buffer is depicted in FIG. 3, search engine circuit 306 may employ one or more additional buffers to store digital samples during processing.

Figure 5:
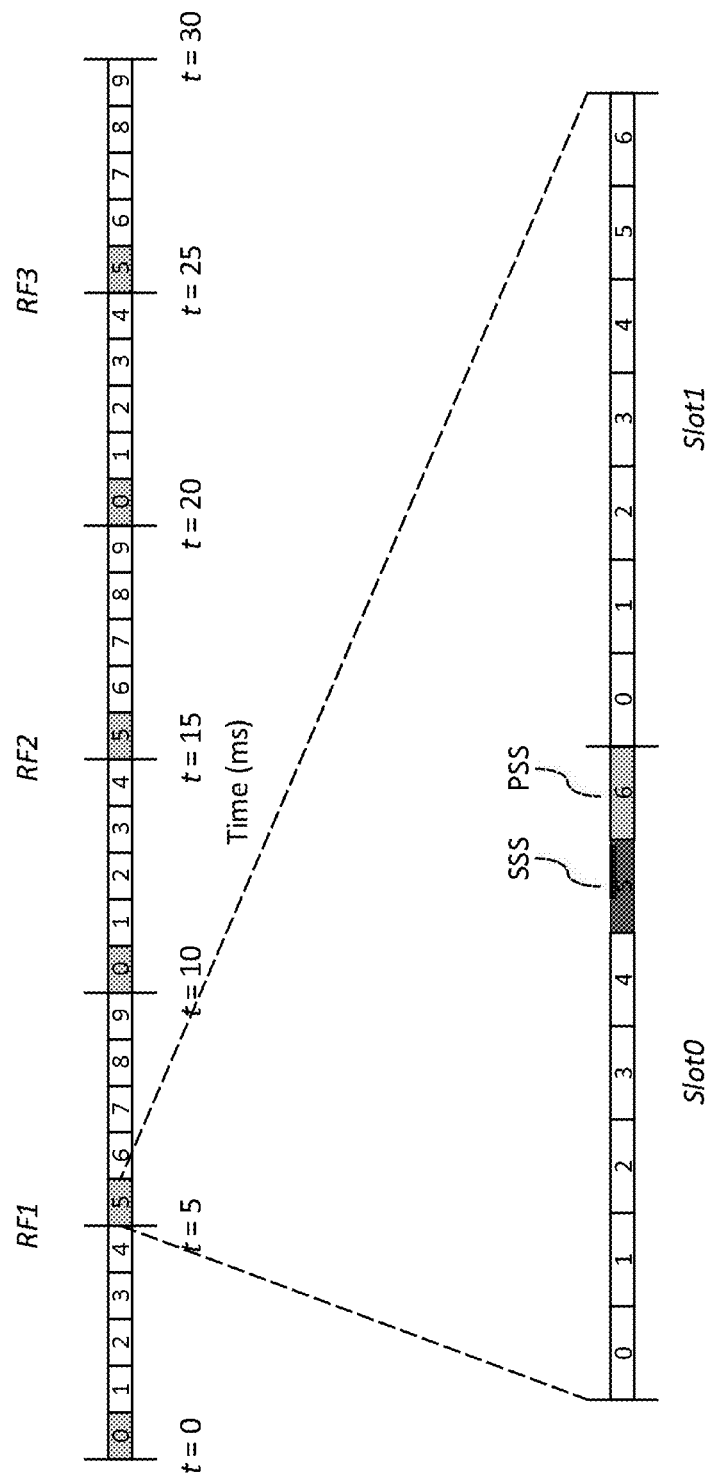
FIG. 5 shows a transmission schedule of synchronization sequences in frequency duplexing mode.
Figure 6:
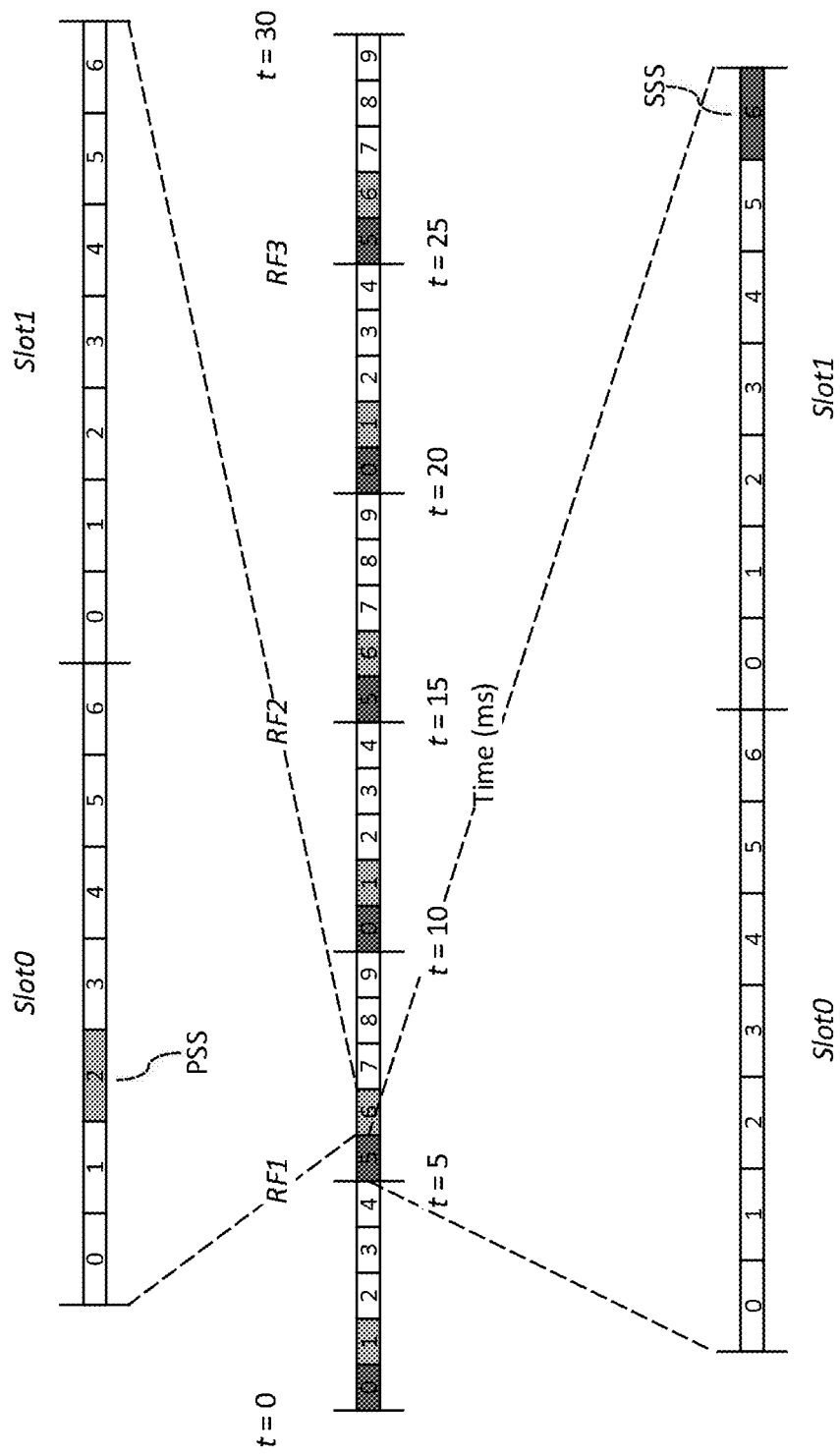
FIG. 6 shows a transmission schedule of synchronization sequences in time duplexing mode.

Search engine circuit 306 may proceed to extract hard data from the new search probe in 406. Accordingly, search engine circuit 306 may process the digital samples of the new search probe stored in buffer 304 to identify the presence of PSS and SSS sequences. As specified by the 3GPP for LTE networks, LTE cells may transmit PSS and SSS sequences each with a 5 ms transmission periodicity according to a fixed pattern, where the fixed pattern may differ between Frequency Division Duplexing (FDD) mode and Time Division Duplexing (TDD) mode. FIG. 5 shows a graphical depiction of the downlink transmission pattern of PSS and SSS sequences in FDD mode. As shown in FIG. 5, LTE cells may transmit downlink signals over a series of 10 ms radio frames, which radio frame is divided into 10 subframes each of 1 ms duration. Each subframe is divided two slots which each contain either 6 or 7 symbol periods depending on the Cyclic Prefix (CP) length. LTE cells may transmit a PSS sequence in the last symbol period of the first slot ($6^{th}$ or $7^{th}$ symbol period of the first slot depending on CP length) and an SSS sequence in symbol period before the PSS, and may repeat this fixed symbol pattern over all radio frames. FIG. 6 shows a graphical depiction of the downlink transmission pattern of PSS and SSS sequences in TDD mode. As shown in FIG. 6, LTE cells may transmit a PSS sequence in the $3^{rd}$ symbol period of the first slot of the $1^{st}$ and $6^{th}$ subframes of each radio frame. LTE cells may then transmit an SSS sequence in the last symbol period of the second slot of the $0^{th}$ and $5^{th}$ subframes ($6^{th}$ or $7^{th}$ symbol period of the second slot depending on CP length). The separation in time between transmitted PSS and SSS sequences may thus vary as a function of both duplexing mode and CP length, which as further detailed below search engine circuit 306 may utilize to determine the duplexing mode and CP length of cells detected during cell search.

In accordance with the Orthogonal Frequency Division Multiplexing (OFDM) scheme employed for downlink in LTE, each LTE may transmit downlink signals over a set of subcarriers, where each set of 12 contiguous subcarriers (spaced every 15 kHz) are grouped into a resource block. An LTE cell may transmit downlink signals over between 6 and 20 resource blocks (dependent on the particular system bandwidth), where each discrete subcarrier of the utilized resource blocks may transmit a single symbol (per symbol period).

As defined in 3GPP Technical Specification 36.211, "Physical channels and modulation", V12.5.0 ("3GPP TS 36.211"), each cell transmits a PSS and SSS sequence pair that identifies the Physical Cell Identity (PCI) of the cell where the PSS sequence gives the physical-layer identity (ranging from 0 to 2) and the SSS sequence gives the physical-layer cell identity group (ranging from 0 to 167). Search engine circuit 306 may identify the PCI (ranging from 0 to 503) of a given cell by identifying the PSS and SSS sequence transmitted by the cell. Each PSS sequence may be a 62-length sequence generated from a frequency-domain Zadoff-Chu root sequence that is mapped to one of the 62 central subcarriers (excluding a central DC subcarrier) of the system bandwidth during the aforementioned PSS symbol period. Each SSS sequence may be a 62-length sequence generated from a frequency-domain pseudorandom noise sequence that is similarly mapped to the 62 central subcarriers during the aforementioned SSS symbol period.

Each of the 3 possible PSS sequences and 168 possible SSS sequences are predefined, and accordingly known at search engine circuit 306. Accordingly, at 406 search engine circuit 306 may compare locally-generated or locally-stored copies of the possible PSS and SSS sequences to the new search probe in order to determine whether the new search probe contains PSS and SSS sequences transmitted by detectable cells and, if so, determine the timing location of the PSS and SSS sequences in the new search probe. By identifying the presence and timing location of PSS and SSS sequences, search engine circuit 306 may determine the PCI of each detectable cell as well as obtain a timing reference to obtain synchronization with each detectable cell (i.e. by virtue of the fixed location in time of PSS and SSS sequences in the downlink transmission schedule of a cell).

In order to extract hard data from the new search probe in 406, search engine circuit 306 may first calculate cross-correlation functions (e.g. soft data) between locally generated copies of each PSS sequence and the digital samples of the new search probe in the time domain. Search engine circuit 306 may then identify the presence of transmitted PSS sequences in the new search probe by analyzing the peaks in the resulting cross-correlation functions, where a peak of sufficient amplitude may indicate the presence of a PSS sequence matching the particular locally-generated PSS sequence utilized to calculate the cross-correlation function. The peak may be located at a particular sample of the new search probe, thus providing a timing reference indicating the potential location in time of a PSS sequence.

Search engine circuit 306 may thus identify one or more timing locations within the new search probe that may mark the location of different specific PSS sequences. Search engine circuit 306 may then utilize locally-generated copies of each SSS sequence to calculate cross-correlation functions with the new search probe to identity the presence of SSS sequences, which may be performed in the frequency domain as a fast-correlation using the related PSS timing location for symbol timing. As previously detailed regarding FIGS. 5 and 6, the timing positions of transmitted PSS and SSS sequences may vary as a function of duplexing mode and CP length. Accordingly, an SSS sequence may appear at a finite number of timing positions relative to a detected PSS sequence, which search engine circuit 306 may utilize in order to evaluate specific timing locations in the new search probe to detect potential SSS sequences based on detected PSS sequences. While search engine circuit 306 may obtain calculate the cross-correlation functions for the PSS sequences in the time-domain, search engine circuit 306 may utilize the one or more timing locations identified via the initial PSS detection as a Fast Fourier Transform (FFT) window to demodulate potential SSS sequences and calculate the SSS cross-correlation functions in the frequency domain. Search engine circuit 306 may then evaluate the resulting cross-correlation functions to determine whether an SSS sequence is present, such as based on the peaks of the cross-correlation functions. Depending on the location of a detected SSS sequence relative to a previously detected PSS sequence, search engine circuit 306 may determine the duplexing mode and CP length of a potential cell present in the new search probe. Such procedures for PSS and SSS detection with cross-correlation are well-established and will be recognized by skilled persons.

Search engine circuit 306 may thus identify one or more potential cells via PSS and SSS detection, wherein each potential cell corresponds to a respective PSS-SSS pair that yielded a "match" with a particular time location in the new search probe. Search engine circuit 306 may then accumulate the various hard data associated with each potential cell, including cell identity (e.g. PCI), timing location (e.g. a sample index or relative timing location within the new search probe), duplex mode (e.g. FDD or TDD), and CP length (normal or extended).

Search engine circuit 306 may additionally calculate a frequency offset, e.g. a Fine Frequency Offset Estimate (FFOE), for each potential cell, which may indicate a difference or "offset" in the carrier frequency of the potential cell and a local oscillator of mobile terminal 102, e.g. a local oscillator in RF transceiver 204 for radio frequency demodulation. Search engine circuit 306 may accumulate hard data characterizing the frequency offset estimate with the remaining hard data.

As previously indicated, PSS and SSS detection may be susceptible to errors caused by noise and other random signal artifacts, and accordingly one or more of the potential cells identified in the new search probe may be real cells while others may be "ghost" or "false" cells. Search engine circuit 306 may thus utilize hard data extracted from multiple search probes in order to detect "matches" between the potential cells identified in the search probes and subsequently determine a final set of detected cells based on the matches. Search engine circuit 306 may thus improve detection sensitivity while avoiding the excessive memory usage involved in applying soft data across multiple search probes.

Accordingly, search engine circuit 306 may utilize database 308 to store and retrieve hard data from previous search probes to utilize for comparison and identification of detected cells. For example, search engine circuit 306 may create an entry in database 308 for each processed search probe, where each entry contains hard data (cell identity, timing location, duplexing mode, CP length) for each identified potential cell for the corresponding search probe. Database 308 may be realized as a memory device, and accordingly may have a fixed capacity. For example, database 308 may be able to store hard data for a specific number of search probes and/or may be able to store hard data for a specific number of identified potential cells per search probe. Search engine circuit 306 may thus operate database 308 on a first in, first out (FIFO) basis, and accordingly may remove hard data for the oldest search probe and subsequently store hard data for the most recent search probe.

FIG. 7 illustrates an exemplary scenario in which database 308 is configured to store hard data for potential cells identified in e.g. five previous search probes (identified as search probe results T2-T6 in FIG. 7), where each entry depicted in FIG. 7 denotes an exemplary cell identity and timing location in the form of {[cell ID/PCI], [timing reference/sample index] }. As database 308 may have a finite capacity (which may be any positive integer), database 308 may store hard data for a fixed number of identified potential cells per search probe, such as e.g. 10 cells per search probe. Accordingly, search engine circuit 306 may provide hard data for identified potential cells that exhibit the highest reliability of being a real cell. Search engine circuit 306 may identify the most reliable potential cells based on e.g. the cross-correlation functions (e.g. peak amplitude) obtained during PSS and SSS detection and subsequently provide hard data for these high-reliability cells to database 308 for storage. Database 308 may discard the hard data from the oldest search probe upon receiving the identified potential cells from search engine circuit 306 for the most recent search probe in accordance with the finite capacity of database 308.

Search engine circuit 306 may thus process the new search probe (stored as soft data in buffer 304) in 406 to obtain the hard data for T1 as shown in FIG. 7. Upon extracting the soft data of the new search probe in 406 to obtain the hard data, search engine circuit 306 may discard the soft data of the new search probe. For example, search engine circuit 306 may clear buffer 304, switch off memory banks of buffer 304, or "free" the memory of buffer 304. Accordingly, search engine circuit 306 may only retain the hard data for the new search probe while discarding the soft data. While method 400 illustrates discarding of the soft data at 406, search engine circuit 306 may discard the soft data at a variety of different times, such as after any one of 408-422 (prior to capturing the next "new" search probe at 404 of the next iteration). Regardless, search engine circuit 306 may discard the soft data for the new search probe prior to processing the next "new" search probe, thus avoiding the storage of soft data for multiple search probes. Furthermore, search engine circuit 306 may treat buffer 304 as a "virtual buffer", i.e. buffer 304 may not correspond to a fixed block of memory addresses, and accordingly search engine circuit 306 is not limited to storing re-using the exact same block of memory addresses to store the soft data for each soft probe. Furthermore, while FIG. 3 depicts a single buffer 304 for storing soft data, search engine circuit 304 may utilize more than one buffer, such as e.g. a first buffer to store soft data for the search probe (i.e. time-domain samples of the search), a second buffer or set of buffers to store PSS detection soft data (e.g. samples of the cross-correlation functions produced via cross-correlating the received search probe with each PSS candidate sequence in the time-domain), a third buffer or set of buffers to store SSS detection soft data (e.g. samples of the cross-correlation functions produced via cross-correlating the received search probe with each SSS candidate sequence in the frequency-domain). Regardless, search engine circuit 306 may only retain extracted hard data and may discard all such soft-data from the current "new" search probe.

Database 308 may store the hard data for the five immediately previous processed search probes as T2-T6, which may occur in a non-contiguous manner relative to T1 and one another depending on the reception schedule of baseband modem 308. For example, physical layer subsystem 300 may have to utilize measurement gaps to capture the downlink signal data for each search probe, and accordingly may only have e.g. 6 ms measurement gaps that occur every 40 or 80 ms. Physical layer subsystem 300 may thus only be able to capture the 5 ms block of downlink data for each search probe every 40 or 80 ms. Furthermore, physical layer subsystem 300 may target more than one frequency layer for cell search where the frequency layers are located on different frequency bands, which may force physical layer subsystem 300 to cycle between the corresponding frequency bands across the available measurement gaps and capture downlink data for each frequency band in an interleaved manner. Accordingly, the search probes connected to search probe results T1-T6 may be contiguous or non-contiguous and may be separated by any arbitrary amount of time.

As previously indicated, search engine circuit 306 may compare the hard data from the most recent search probe (search probe results T1) to the hard data from the search probes stored in database 308 (search probe results T1-T6) in order to detect matches and subsequently discriminate real cells from ghost cells. Search engine circuit 306 may utilize a variety of detection criteria in order to render a decision for each potential cell identified in T1-T6. For example, search engine circuit 306 may compare T1 to each of T2-T6 to determine whether any of the potential cells of T1 produce a match with any of the potential cells of T1-T6 on the basis of the associated hard data. Search engine circuit 306 may then classify a given potential cell as a real cell if the potential cell appears more than a certain number of times across T1-T6, i.e. more than a count threshold. Search engine circuit 306 may then report classified real cells to PHY controller 302.

Accordingly, search engine circuit 306 may retrieve the hard data for the "next" search probe from database 308 in 408, e.g. T2, and compare the hard data for the retrieved search result to the hard data from the new search probe in 410-412. As shown in FIG. 4, search engine circuit 306 may compare hard data on the basis of cell ID, time reference, and one or more additional criteria such as duplexing mode and cyclic prefix length.

Search engine circuit 306 may then compare the cell IDs of the potential cells of search probe result T1 (new search probe) to the cell IDs of the potential cells of search probe result T2 (next search probe in database 308) in 410 to determine whether any of the potential cells have matching cell IDs. If search engine circuit 306 does not identify any potential cells with matching cell IDs, search engine circuit 306 may determine that search probe result T1 does not contain any matches with search probe result T2 and may proceed to 420 to process any further search probe results in database 308 for comparison with T1.

If search engine circuit 306 detects one or more potential cells in T1 that match with potential cells in T2 on the basis of cell ID, search engine circuit 306 may proceed to 412 to compare the time references of the one or more matching potential cells identified in 410. Search engine circuit 306 may generate the time reference for each potential cell based on the detected PSS or SSS location, where the time reference may be a sample index (e.g. digital sample number) or timing point within the search probe (e.g. half-frame) that identifies the location of PSS, SSS, or some other predefined timing point relative to a PSS or SSS timing location. Assuming search engine circuit 306 processes each search probe with the same timing reference, PSS and SSS timing locations within each search probe should remain relatively constant over each search probe. Search engine circuit 306 may thus compare the time references for each of the one or more matching potential cells in order to determine whether the time references match. In order to compensate for potential effects of noise, device movement (e.g. closer to or further from a transmitting cell, thus affecting PSS and SSS propagation time), or received channel fingers, search engine circuit 306 may utilize a tolerance threshold to identify time reference matches, i.e. may declare a time reference match if the time reference for a given potential matching cell from a first search probe is within the tolerance threshold in time from a time reference a potential matching cell from a second search probe. Search engine circuit 306 may proceed to 414 if there are potential cells in T1 that produce a cell ID and time reference match or may proceed to 420 otherwise.

Search engine circuit 306 may thus identify potential cells from T1 that produce both a cell ID and time reference match with potential cells from T2. By utilizing two criteria, cell ID and time reference, search engine circuit 306 may improve the false detection rate, as it may be probabilistically unlikely for noise and other random effects to produce a ghost cell that produces a consistent cell ID and time reference across multiple search probes. However, real cells (assuming sufficient SNR) may be expected to reliably produce consistent cell ID and time reference.

Search engine circuit 306 may utilize additional criteria based on the extracted hard data from each search probe in 414 to further distinguish between real cells in ghost cells. For example, search engine circuit 306 may compare one or both of duplex mode and CP length in 414 between potential cells from 412 (i.e. matching according to both cell ID and time reference) in order to determine whether potential cells from 412 additionally have matching duplex mode and/or CP length. As cell ID and time reference matches may be sufficient in many scenarios to classify real cells, the additional criteria comparison in 414 may be considered optional; however, such may nevertheless improve false detection rates.

Following 414, search engine circuit 306 may thus have potential cells in T1 and T2 that match according to cell ID, time reference, and (optionally) duplex mode and/or CP length, i.e. that match according to the match criteria. As previously indicated, search engine circuit 306 may require that a potential cell appear at least a certain number of times over T1-T6 before the cell is reported to PHY controller 302 as a real cell, i.e. more than a count threshold. Given a count threshold of one, search engine circuit 306 may report each potential cell (satisfying PSS and SSS detection thresholds) from each search probe to PHY controller 302, i.e. without performing comparisons and identifying matches based on hard data; however, such may not provide sufficient ghost cell filtering as only one search probe of data is considered. In order to improve ghost cell filtering, search engine circuit 306 may use a count threshold of two or more, where a count threshold of two requires that a given cell appear in at least two search probe results in order to be classified as a ghost cell, i.e. produce at least one match among T1-T6.

Accordingly, search engine circuit 306 may maintain a count for each potential cell of T1 during 408-410, where each potential cell of T1 begins with a count of one by virtue of detection in T1. Search engine circuit 306 may increment the count for each valid match with a potential cell in T2-T6, and accordingly may increment the count for each potential cell of T1 that produces a match with a potential cell in T2 according to the match criteria, e.g. cell ID, time reference, and (optionally) duplex mode and/or CP length. Search engine circuit 306 may increment the count prior to 416.

Search engine circuit 306 may then compare the count for each potential cell of T1 that produces a match with a potential cell of T2 to determine whether search engine circuit 306 should report the potential cell to PHY controller 302 as a real cell. Accordingly, search engine circuit 306 may report each potential cell of T1 that has a count equal to the count threshold as a real cell to PHY controller 302 in 418. Any positive integer value with an upper bound determined by the capacity of database 308 may be selected as the count threshold, where lower selections for the count threshold may result in an increased false detection (more ghost cells mistakenly classified as real) and higher selections for the count threshold may reduce detection sensitivity (missed real cells). The count threshold may be provided by the network, e.g. received as control signaling (such as e.g. as part of measurement and reporting criteria) or may be defined by a vendor.

Search engine circuit 306 may report identified real cells in 418 by providing PHY controller 302 with hard data for the identified real cells (either stored external to database 308 as T1 or stored internal to database 308 as T2-T6). For example, search engine circuit 306 may provide PHY controller 302 with the cell identity (e.g. PCI), timing location (e.g. a sample index or relative timing location within the search probe), duplex mode (e.g. FDD or TDD), CP length (e.g. normal or extended), and frequency offset (e.g. FFOE) of the identified real cells. While hard data such as cell ID, duplex mode, and CP length may be identical between the matching potential cells of the corresponding search probe results, the time reference and frequency offset may not exactly match. For example, as further detailed below the time references between "matching" potential cells from two or more different search probe results may be separated by up to a tolerance value. Similarly, the frequency offset between matching potential cells may also differ. In recognition of such, search engine circuit 306 may either select to report hard data from a single search probe result, e.g. by reporting the most recent relevant hard data (e.g. the time reference/frequency offset obtained from the most recent search probe result, e.g. T1, which may be the most current or "up-to-date" value) or by combining the hard data obtained over multiple search probe results (e.g. by averaging the time references/frequency offsets from the corresponding search probe results) and reporting the combined hard data value.

After reporting any identified real cells in 418, search engine circuit 306 may then proceed to 420 to determine whether there are any search probe results remaining in database 308. As search engine circuit 306 has only evaluated T1 and T2, search engine circuit 306 may proceed to 408 to retrieve the next search probe result T3 from database 308.

Search engine circuit 306 may thus repeat 410-418 with T3 by comparing the hard data for potential cells of search probe result T1 to the hard data for potential cells of search probe result T3. Search engine circuit 306 may thus similarly declare matches between T1 and T3 according to the match criteria, e.g. cell ID, time reference, and (optionally) duplex mode and/or CP length, and increment the count for each potential cell of T1 if a match is detected with T3.

Search engine circuit 306 may then determine if the count for any potential cell of T1 is equal to the count threshold in 416 and subsequently report such cells to PHY controller 302 as real cells in 418. As search engine circuit 306 may only report potential cells of T1 with a count equal to the count threshold, search engine circuit 306 may only report each potential cell of T1 a single time. Search engine circuit 306 may additionally be configured to stop retrieving search probe results from database 308 if all potential cells of T1 have been reported, i.e. if each potential cell of T1 satisfied the count threshold. Search engine circuit 306 may thus avoid unnecessary processing; however, depending on the number of potential cells retained for T1 it may be reasonably unlikely for search engine circuit 306 to report all potential cells of T1 as real cells.

Search engine circuit 306 may proceed to compare the potential cells of T1 to each search probe result stored in database 308 while reporting real cells after T1 has been compared to a given search probe result. Referring to the exemplary content of database 308 depicted in FIG. 7, search engine circuit 306 may identify cell ID 127 as a real cell during method 400 given a count threshold of 2. As shown in FIG. 7, search engine circuit 306 may detect cell ID 127 as a match according to cell ID between T1 and T4, e.g. in 410 during the iteration of 408-420 in which search engine circuit 306 compares T1 to T4. Search engine circuit 306 may then determine if any potential cells with matching cell ID have matching timing references (including tolerance) in 412. As shown in FIG. 7, potential cell ID 127 in T1 may have a timing reference of 1354, which may refer to e.g. the $1354^{th}$ sample within the connected search probe or e.g. 1354 units of a predefined time unit. Potential cell ID 127 in T4 may have a time reference of 1350. Although the time references may not be identical, search engine circuit 306 may declare a match on the basis of a tolerance value for time reference matching. For example, search engine circuit 306 may declare a match if $|tref_1-tref_2| \leq Tol$, where $tref_1$ and $tref_2$ are the time references from two potential cells and Tol is the tolerance. Accordingly, assuming $Tol \geq 4$, search engine circuit 306 may declare a match between potential cell ID 127 in T1 and T4 and subsequently report cell ID 127 to PHY controller 302 as a real cell (assuming additional criteria, if any, also match).

In contrast, search engine circuit 306 may not have declared cell ID 67 as a real cell despite cell ID 67 appearing in both T2 and T6, which search engine circuit 306 may have compared for the immediately previous search probe (e.g. when the hard data currently in T2 was in the T1 position). As the time reference for cell ID 67 in T2 is 10354 and the time reference for cell ID 67 in T6 is 1354 ($|tref_1-tref_2|=9000$), the difference between the time references would exceed the tolerance for any value of Tol<9000. Search engine circuit 306 may thus not report cell ID 67 as a real cell for an exemplary tolerance of e.g. Tol=20, as the substantial difference in time reference likely indicates that cell ID 67 was mistakenly detected, i.e. is a ghost cell. Such tolerance values are exemplary and the tolerance may be set based on a desired detection sensitivity and dependent on the unit used for the time references.

After search engine circuit 306 has completed comparison of T1 to T2-T6 in 408-420, search engine circuit 306 may proceed to 422 to update database 308. As previously detailed, search engine circuit 306 may operate database 308 in a First In, First Out (FIFO) manner in order to abide by the fixed capacity of database 308. Accordingly, search engine circuit 306 may update database 308 by shifting T2-T5 to the left and discarding T6. Search engine circuit 306 may then store the hard data for the potential cells of the new search probe (previously T1) in the previous location of T2. Search engine circuit 306 may then return to 404 to capture a "new" search probe for the targeted frequency layer, which may be immediately after the previous "new" search probe has completed (contiguous) or may a certain amount of time following completion after the previous "new" search probe (non-contiguous), e.g. if search engine circuit 306 is obtaining each search probe during measurement gaps and/or by cycling through different frequency bands. Search engine circuit 306 may proceed to iterate over method 400 to process new search probes, extract hard data, and report valid cells of each new search probe as real cells to PHY controller 302 based on the hard data from previous search probes stored in database 308.

PHY controller 302 may receive the real cells reported by search engine circuit 306 and proceed according to the control flow of the particular communication standard. For example, in an LTE context PHY controller 302 may have received a measurement command from the RRC entity of protocol stack subsystem 312, and accordingly may be expected to report radio measurements of detected cells to the RRC entity. Upon receiving reports from search engine circuit 306 that identify real cells, PHY controller 302 may provide information of the reported real cells to measurement engine circuit 310 as part of a measurement command. Measurement engine circuit 310 may subsequently perform radio measurement on the specified cells using the provided information, such as by applying PCI, duplex mode, CP length, and time reference to identify the location of particular reference signals used for radio measurements (such as Cell Specific Reference Signals (CRS)). PHY controller 302 may receive and report the resulting radio measurements to the RRC entity, which may trigger measurement reporting that involves transmitting a measurement report to the network that details the detected cells and radio measurements, such as e.g. part of a handover procedure. Alternatively, the radio measurements may be utilized for cell selection or reselection (as part of a radio idle state), which may involve baseband modem 206 selecting a serving cell as dictated by the control flow of protocol stack subsystem 312. PHY controller 302 may additionally trigger system information reading (MIB and/or SIBS) on cells reported by search engine circuit 306 as real cells. Accordingly, PHY controller 302 may utilize the reported real cells for a variety of mobility procedures. The applicable mobility procedures are not limited to the examples expressly given herein.

Method 400 may be modified to reduce reporting delays, such as by immediately reporting the strongest cells from each search probe to PHY controller 302 to allow for immediate measurement. For example, search engine circuit 306 may identify one or more "strongest" cells during each search probe, such as on the basis of PSS and/or SSS detection criteria including cross-correlation peak amplitude and other criteria. Search engine circuit 306 may immediately report such cells to PHY controller 302 as real cells, i.e. prior to comparison in 408-418. If a valid match is detected between a "strongest" cell and another search probe result, search engine circuit 306 may either re-report the strongest cell or forego re-reporting to avoid redundancy.

Accordingly, search engine circuit 306 may accurately report detected cells to PHY controller 302 by comparing hard data obtained over multiple search probes to identify matches. Search engine circuit 306 may only need to retain hard data from each search probe, and accordingly may discard any soft data (e.g. time-domain search probe samples, PSS cross-correlation samples, SSS cross-correlation samples) following extraction of the hard data. Search engine circuit 306 may thus dramatically reduce memory usage, in particular compared to soft data-dependent detection schemes that utilize averaging or combining of soft data over multiple search probes, in particular for non-coherent accumulation or averaging of PSS cross-correlation data. As search engine circuit 306 may identify real cells by comparing hard data from multiple search probes, search engine circuit 306 may accurately filter out ghost cells and effectively detect real cells even in low SNR conditions.

Search engine circuit 306 may obey a similar procedure during initial iterations of method 400, such as before database 308 has been fully populated with search probe results. For example, if search engine circuit 306 has not previously stored any search probe results in database 308, search engine circuit 306 may only have T1 available, and accordingly may not be able to report any real cells on the basis of a count threshold unless the count threshold is set to one. Similar scenarios may occur if the count threshold is set to e.g. three and database 308 only contains hard data for search probe result T2. Accordingly, in order to avoid excessive reporting delays with count threshold set to two search engine circuit 306 may identify one or more strongest cells from T1 and immediately report such cells as real cells to PHY controller 302. In the event that the count threshold is e.g. three and database 308 contains only T2, search engine circuit 306 may either report any potential cells with a count of two (i.e. not equal to the threshold) and/or report one or more "strongest" cells. Once database 308 contains the appropriate number of search probe results (which may be prior to database 308 reaching full capacity depending on the count threshold) facilitate real cell identification based on the count threshold, search engine circuit 306 may begin utilizing the count threshold with the available search probe results according to method 400.

While a search probe may need to be at least as long as the transmission periodicity of the targeted synchronization sequences (e.g. 5 ms for PSS and SSS), search engine circuit 306 may be capable of using different durations of downlink signal as a search probe. For example, if search engine circuit 306 has a continuous block of e.g. 10 ms available to capture downlink signals, search engine circuit 306 may capture both 5 ms half-frames and subsequently process both 5 ms blocks as a search probe. Alternatively, search engine circuit 306 may sequentially process multiple 5 ms half-frames to produce PSS cross-correlation results and perform non-coherent accumulation or averaging on the resulting PSS cross-correlation results. Search engine circuit 306 may then extract hard data using the accumulated PSS cross-correlation results, thus employing multiple 5 ms half-frames as a single search probe. However, such accumulation or averaging operations may result in analogous memory usage problems as a result of the need to store soft data between each received half-frame.

Figure 8:
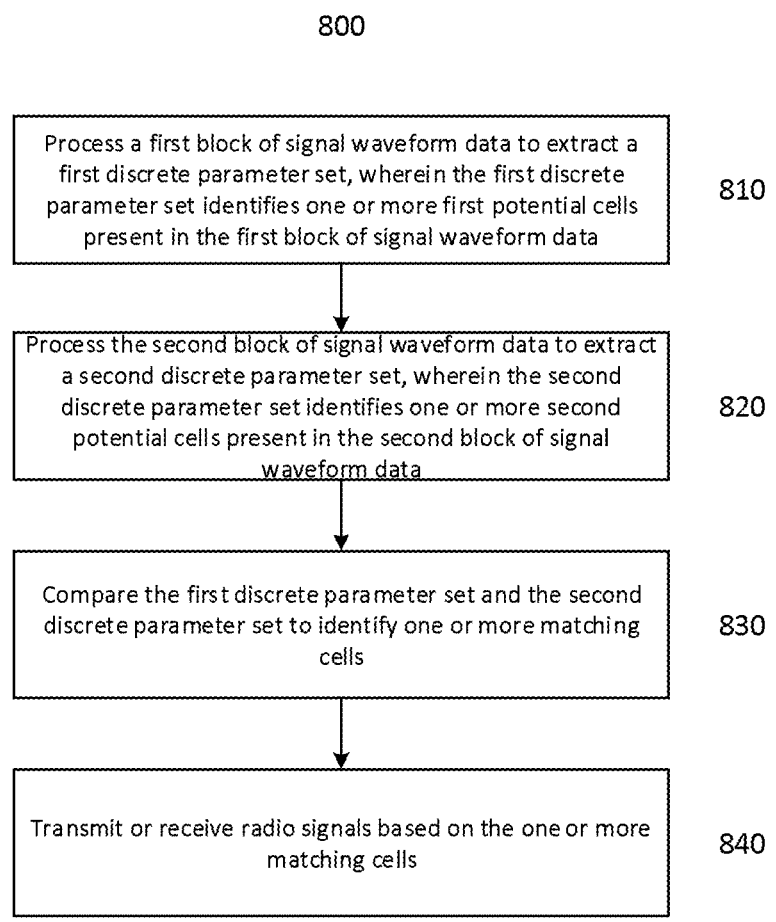
FIG. 8 shows a first method of detecting network cells.

FIG. 8 shows method 800 for identifying network cells. As shown in FIG. 8, method 800 may include processing a first block of signal waveform data to extract a first discrete parameter set (810), wherein the first discrete parameter set identifies one or more first potential cells present in the first block of signal waveform data, processing the second block of signal waveform data to extract a second discrete parameter set (820), wherein the second discrete parameter set identifies one or more second potential cells present in the second block of signal waveform data, comparing the first discrete parameter set and the second discrete parameter set to identify one or more matching cells (830), and transmitting or receiving radio signals based on the one or more matching cells (840).

In one or more further exemplary aspects of the disclosure, one or more of the features described above in reference to FIGS. 1-7 may be further incorporated into method 800. In particular, method 800 may be configured to perform further and/or alternate processes as detailed regarding mobile terminal 102 and/or baseband modem 206.

Figure 9:
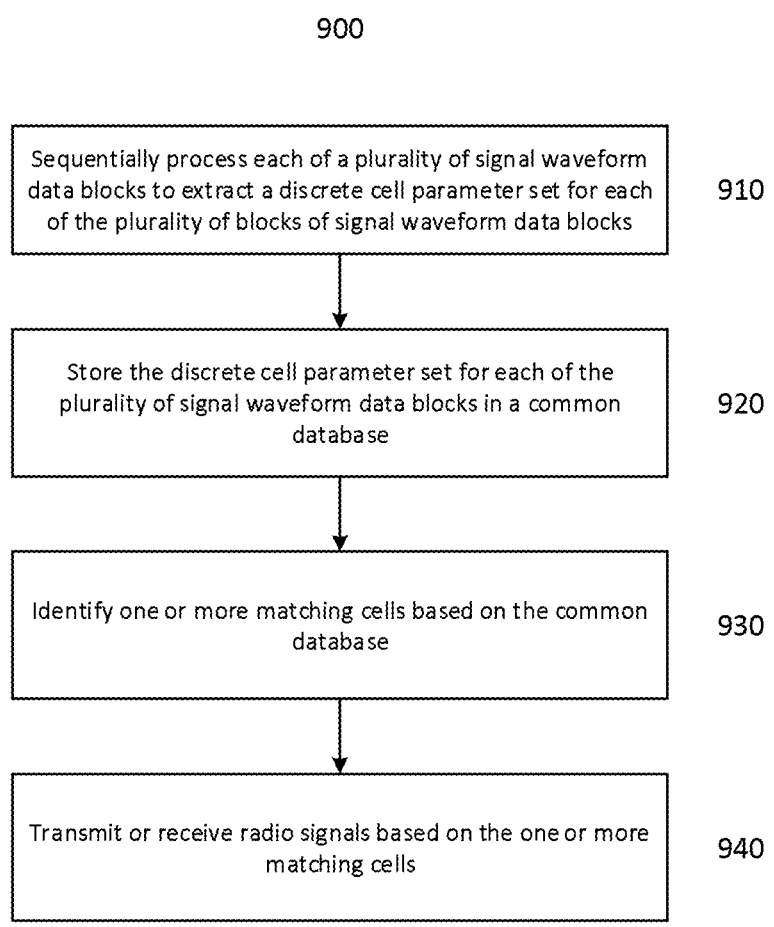
FIG. 9 shows a second method of detecting network cells.

FIG. 9 shows method 900 for identifying network cells. As shown in FIG. 9, method 900 may include sequentially processing each of a plurality of signal waveform data blocks to extract a discrete cell parameter set for each of the plurality of blocks of signal waveform data blocks (910), storing the discrete cell parameter set for each of the plurality of signal waveform data blocks in a common database (920), identifying one or more matching cells based on the common database (930), and transmitting or receiving radio signals based on the one or more matching cells (940).

In one or more further exemplary aspects of the disclosure, one or more of the features described above in reference to FIGS. 1-7 may be further incorporated into method 900. In particular, method 900 may be configured to perform further and/or alternate processes as detailed regarding mobile terminal 102 and/or baseband modem 206.

The terms "user equipment", "UE", "mobile terminal", "user terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method. Furthermore, the functionality detailed herein regarding digital circuits and processors is considered interchangeable. Accordingly, skilled persons will appreciate the ability to embody the functionality of a digital circuit as functionally equivalent program code for execution on a processor, and vice versa.

The following examples pertain to further aspects of the disclosure:

Example 1 is a method for identifying network cells, the method including processing a first block of signal waveform data to extract a first discrete parameter set, wherein the first discrete parameter set identifies one or more first potential cells present in the first block of signal waveform data, processing the second block of signal waveform data to extract a second discrete parameter set, wherein the second discrete parameter set identifies one or more second potential cells present in the second block of signal waveform data, comparing the first discrete parameter set and the second discrete parameter set to identify one or more matching cells, and transmitting or receiving radio signals based on the one or more matching cells.

In Example 2, the subject matter of Example 1 can optionally further include discarding the first block of signal waveform data before processing the second block of signal waveform data to extract the second discrete parameter set.

In Example 3, the subject matter of Example 2 can optionally include wherein discarding the first block of signal waveform data includes discarding the first block of signal waveform data after processing the first block of signal waveform data to extract the first discrete parameter set and before processing the second block of signal waveform data to extract the second discrete parameter set.

In Example 4, the subject matter of Example 2 or 3 can optionally further include temporarily storing the first block of signal waveform data in a buffer, and wherein discarding the first block of signal waveform data includes discarding the first block of signal waveform data from the buffer.

In Example 5, the subject matter of Example 1 or 2 can optionally include wherein the first discrete parameter set includes one or more first cell identity and cell timing pairs that identify the one or more first potential cells and the second discrete parameter set includes one or more second cell identity and cell timing pairs that identify the one or more second potential cells.

In Example 6, the subject matter of Example 5 can optionally include wherein transmitting or receiving radio signals based on the one or more matching cells includes determining cell identity information and cell timing information of a target cell of the one or more matching cells, and transmitting or receiving radio signals with the cell identity information and cell timing information.

In Example 7, the subject matter of Example 5 can optionally include wherein comparing the first discrete parameter set and the second discrete parameter set to identify the one or more matching cells includes comparing the one or more cell identity and cell timing pairs of the first discrete parameter set to the one or more cell identity and cell timing pairs of the second discrete parameter set to identify one or more matching cell identity and cell timing pairs.

In Example 8, the subject matter of Example 7 can optionally include wherein the one or more matching cell identity and cell timing pairs are included in both the one or more cell identity and cell timing pairs of the first discrete parameter set and the one or more cell identity and cell timing pairs of the second discrete parameter set.

In Example 9, the subject matter of Example 1 or 2 can optionally include wherein comparing the first discrete parameter set and the second discrete parameter set to identify the one or more matching cells includes performing ghost cell filtering with the first discrete parameter set and the second discrete parameter set to identify the one or more matching cells as real cells.

In Example 10, the subject matter of any one of Examples 1 to 9 can optionally further include discarding the second block of signal waveform data after processing the second block of signal waveform data.

In Example 11, the subject matter of any one of Examples 1 to 10 can optionally include wherein processing the first block of signal waveform data to extract the first discrete parameter set includes performing synchronization sequence detection on the first block of signal waveform data, wherein the first discrete parameter set identifies one or more synchronization sequences transmitted by the one or more first potential cells.

In Example 12, the subject matter of Example 11 can optionally include wherein performing synchronization sequence detection on the first block of signal waveform data includes performing Primary Synchronization Signal (PSS) or Secondary Synchronization Signal (SSS) detection on the first block of signal waveform data.

In Example 13, the subject matter of any one of Examples 1 to 12 can optionally include wherein processing the second block of signal waveform data to extract the second discrete parameter set includes performing synchronization sequence detection on the second block of signal waveform data, wherein the second discrete parameter set identifies one or more synchronization sequences transmitted by the one or more second potential cells.

In Example 14, the subject matter of Example 1 or 2 can optionally include wherein comparing the first discrete parameter set and the second discrete parameter set to identify the one or more matching cells includes identifying one or more cells that are represented in both the first discrete parameter set and the second discrete parameter set as the one or more matching cells.

In Example 15, the subject matter of Example 1 or 2 can optionally include wherein comparing the first discrete parameter set and the second discrete parameter set to identify the one or more matching cells includes identifying the one or matching cells based on one or more of cell identity parameters, cell timing parameters, cell duplex mode parameters, or cell cyclic prefix length parameters.

In Example 16, the subject matter of Example 1 or 2 can optionally include wherein processing the first block of signal waveform data to extract the first discrete parameter set includes identifying one or more candidate cells that are detectable in the first block of signal waveform data, identifying one or more strongest candidate cells of the one or more candidate cells, and generating the first discrete parameter set with the one or more strongest candidate cells as the one or more first potential cells.

In Example 17, the subject matter of Example 16 can optionally include wherein processing the first block of signal waveform data to extract the first discrete parameter set further includes excluding one or more weak candidate cells from the one or more first potential cells.

In Example 18, the subject matter of Example 1 or 2 can optionally include wherein processing the first block of signal waveform data to extract the first discrete parameter set includes identifying one or more first candidate cells that are detectable in the first block of signal waveform data, exclusively selecting the one or more first potential cells as a smaller subset of the one on or more first candidate cells, and storing the first discrete parameter set in a database.

In Example 19, the subject matter of Example 18 can optionally include wherein processing the second block of signal waveform data to extract the second discrete parameter set includes identifying one or more second candidate cells that are detectable in the second block of signal waveform data, exclusively selecting the one or more second potential cells as a smaller subset of the one on or more second candidate cells, and storing the second discrete parameter set in the database.

In Example 20, the subject matter of any one of Examples 1 to 17 can optionally further include storing the first discrete parameter set and the second discrete parameter set in a database.

In Example 21, the subject matter of any one of Examples 1 to 20 can optionally further include processing one or more additional blocks of signal waveform data to extract one or more additional discrete parameter sets, storing each of the one or more additional discrete parameter sets in a database, and identifying one or more additional matching cells based on the one or more additional discrete parameter sets, and transmitting or receiving radio signals based on the one or more additional matching cells.

In Example 22, the subject matter of any one of Examples 1 to 21 can optionally include wherein transmitting or receiving radio signals based on the one or more matching cells includes one or more of transmitting or receiving radio signals with a target cell of the one or more matching cells, establishing a radio connection with the target cell of the one or more matching cells, performing radio measurements on the target cell of the one or more matching cells, or transmitting a report on the target cell to a cellular communication network.

Example 23 is a mobile communication device including an RF transceiver and a baseband communication circuit, the mobile communication device configured to execute the method of any one of Examples 1 to 22.

Example 24 is a non-transitory computer readable medium storing instructions that when executed by a processor control the processor to perform the method of any one of Examples 1 to 23.

Example 25 is a method of identifying network cells, the method including sequentially processing each of a plurality of signal waveform data blocks to extract a discrete cell parameter set for each of the plurality of blocks of signal waveform data blocks and, storing the discrete cell parameter set for each of the plurality of signal waveform data blocks in a common database, identifying one or more matching cells based on the common database, and transmitting or receiving radio signals based on the one or more matching cells.

In Example 26, the subject matter of Example 25 can optionally further include discarding each respective signal waveform data block of the plurality of signal waveform data blocks after extracting the corresponding discrete cell parameter set.

In Example 27, the subject matter of Example 25 or 26 can optionally include wherein sequentially processing each of the plurality of signal waveform data blocks to extract the discrete cell parameter set for each of the plurality of signal waveform data blocks includes discarding each respective signal waveform data block of the plurality of signal waveform data blocks prior to processing a subsequent signal waveform block of the plurality of signal waveform blocks.

In Example 28, the subject matter of any one of Examples 25 to 27 can optionally include wherein sequentially processing each of the plurality of signal waveform data blocks to extract the discrete cell parameter set for each of the plurality of signal waveform data includes performing reference signal detection on each of the plurality of signal waveform data blocks to extract the discrete cell parameter set for each of the plurality of blocks of signal waveform data.

In Example 29, the subject matter of Example 28 can optionally include wherein the reference signal detection includes synchronization sequence detection.

In Example 30, the subject matter of Example 28 can optionally include wherein the reference signal detection includes Primary Synchronization Signal (PSS) detection or Secondary Synchronization Signal (SSS) detection.

In Example 31, the subject matter of any one of Examples 26 to 30 can optionally further include temporarily storing each of the plurality of signal waveform data blocks in a memory during the sequential processing of each individual signal waveform data block, and wherein discarding each respective signal waveform data block of the plurality of signal waveform data blocks after extracting the corresponding discrete cell parameter set includes discarding each of the plurality of signal waveform data blocks from the memory.

In Example 32, the subject matter of any one of Examples 25 to 31 can optionally include wherein identifying the one or more matching cells based on the common database includes comparing the discrete cell parameter sets for the plurality of signal waveform data blocks stored in the common database to identify one or more candidate cells that are detectable in at least a predefined quantity of the plurality of signal waveform data blocks, and selecting the one or more candidate cells as the one or more matching cells.

In Example 33, the subject matter of Example 32 can optionally include wherein the predefined quantity is a count threshold greater than one.

In Example 34, the subject matter of Example 25 or 26 can optionally include wherein each of the discrete cell parameters sets for the plurality of signal waveform data blocks identifies one or more potential cells that are detectable in the respective signal waveform data block of the plurality of signal waveform data blocks.

In Example 35, the subject matter of Example 34 can optionally include wherein the discrete cell parameter sets for the plurality of signal waveform data blocks include one or more cell identity parameters and one or more cell timing parameters.

In Example 36, the subject matter of Example 35 can optionally include wherein sequentially processing each of the plurality of signal waveform data blocks to extract the discrete cell parameter set for each of the plurality of blocks of signal waveform data blocks includes performing synchronization sequence detection on each of the plurality of signal waveform data blocks to determine the one or more cell identity parameters and the one or more cell timing parameters.

In Example 37, the subject matter of Example 36 can optionally include wherein the one or more cell identity parameters include one or more Physical Cell IDs (PCIs) and the one or more cell timing parameters include one or more timing locations relative to a detected synchronization sequence.

In Example 38, the subject matter of Example 34 can optionally include wherein identifying one or more matching cells based on the common database includes identifying one or more cell identity and cell timing parameter pairs that are included in at least a predefined quantity of the discrete cell parameter sets for the plurality of signal waveform data blocks, and identifying the one or more matching cells based on the one or more cell identity and cell timing parameter pairs.

In Example 39, the subject matter of any one of Examples 25 to 31 can optionally include wherein identifying the one or more matching cells based on the common database includes identifying one or more discrete cell parameters that match according to cell identity information and cell timing information, and identifying the one or more matching cells according to the identified one or more discrete cell parameters.

In Example 40, the subject matter of Example 25 or 26 can optionally include wherein the discrete cell parameter sets for the plurality of signal waveform data blocks include one or more of cell identity information, cell timing information, cell duplex mode information, or cell cyclic prefix information that correspond to one or more potential cells that are detectable in the respective signal waveform data block.

In Example 41, the subject matter of Example 40 can optionally include wherein identifying the one or more matching cells based on the common database includes identifying the matching cells based on cell identity information, cell timing information, cell duplex mode information, or cell cyclic prefix information that appear in at least a predefined quantity of the discrete cell parameter sets for the plurality of signal waveform data blocks.

In Example 42, the subject matter of Example 25 or 26 can optionally include wherein sequentially processing each of the plurality of signal waveform data blocks to extract the discrete cell parameter set for each of the plurality of blocks of signal waveform data includes processing each of the plurality of signal waveform data blocks to identify one or more candidate cells present in each of the plurality of signal waveform data blocks, evaluating the one or more candidate cells of each of the plurality of signal waveform data blocks to exclusively identify one or more strong cells from the one or more candidate cells, and extracting the discrete cell parameters for each of the plurality of signal waveform data blocks with the one or more strong cells.

In Example 43, the subject matter of Example 25 or 26 can optionally include wherein each of the plurality of signal waveform data blocks contains detectable contributions from a plurality of cells, and wherein storing the discrete cell parameter set for each of the plurality of signal waveform data blocks in the common database includes exclusively storing cell parameters for one or more strong cells of the plurality of cells in the common database as the discrete cell parameter set for each of the plurality of signal waveform data blocks.

In Example 44, the subject matter of Example 25 or 26 can optionally include wherein identifying one or more matching cells based on the common database includes performing ghost cell filtering to identify the one or more matching cells as real cells based on the common database.

In Example 45, the subject matter of any one of Examples 25 to 44 can optionally include wherein transmitting or receiving radio signals based on the one or more matching cells includes one or more of transmitting or receiving radio signals with a target cell of the one or more matching cells, establishing a radio connection with the target cell of the one or more matching cells, performing radio measurements on the target cell of the one or more matching cells, or transmitting a report on the target cell to a cellular communication network.

In Example 46, the subject matter of any one of Examples 25 to 45 can optionally include wherein the one or more matching cells include one or more network cells of a $3^{rd}$ Generation Partnership Project (3GPP) radio access network.

In Example 47, the subject matter of any one of Examples 25 to 46 can optionally include wherein the one or more matching cells include one or more Long Term Evolution (LTE) cells, one or more Universal System for Mobile Telecommunications (UMTS) cells, or one or more Global System for Mobile Communication (GSM) cells.

Example 48 is a mobile communication device including an RF transceiver and a baseband communication circuit, the mobile communication device configured to execute the method of any one of Examples 25 to 47.

Example 49 is a non-transitory computer readable medium storing instructions that when executed by a processor control the processor to perform the method of any one of Examples 25 to 47.

Example 50 is a method for identifying network cells, the method including processing a first block of signal waveform data to extract one or more first cell identity and cell timing pairs, each first cell identity and cell timing pair characterizing a potential cell present in the first block of signal waveform data, processing a second block of signal waveform data to extract one or more second cell identity and cell timing pairs, each second cell identity and cell timing pair characterizing a potential cell present in the first block of signal waveform data, comparing the one or more first cell identity and cell timing pairs with the one or more second cell identity and cell timing pairs to identify one or more matching cells, and transmitting or receiving radio signals based on the one or more matching cells.

Example 51 is a mobile communication device including an RF transceiver and a baseband communication circuit, the mobile communication device configured to execute the method of Example 50.

Example 52 is a non-transitory computer readable medium storing instructions that when executed by a processor control the processor to perform the method of Example 50.

Example 53 is a mobile communication device including a cell search circuit configured to process a first block of signal waveform data to extract a first discrete parameter set, wherein the first discrete parameter set identifies one or more first potential cells present in the first block of signal waveform data, process the second block of signal waveform data to extract a second discrete parameter set, wherein the second discrete parameter set identifies one or more second potential cells present in the second block of signal waveform data, and compare the first discrete parameter set and the second discrete parameter set to identify one or more matching cells, and an RF transceiver configured to transmit or receive radio signals based on the one or more matching cells.

In Example 54, the subject matter of Example 53 can optionally further include a baseband modem, wherein the baseband modem includes the cell search circuit.

In Example 55, the subject matter of Example 53 can optionally include wherein the cell search circuit is further configured to discard the first block of signal waveform data before processing the second block of signal waveform data to extract the second discrete parameter set.

In Example 56, the subject matter of Example 55 can optionally further include a signal memory, wherein the cell search circuit is configured to discard the first block of signal waveform data by discarding the first block of signal waveform data from the signal memory before processing the second block of signal waveform data to extract the second discrete parameter set.

In Example 57, the subject matter of Example 56 can optionally include wherein the signal memory is configured to store the first block of signal waveform data while the cell search circuit processes the first block of signal waveform data.

In Example 58, the subject matter of Example 56 can optionally include wherein the signal memory is configured to store the second block of signal waveform data while the cell search circuit processes the second block of signal waveform data, and wherein the cell search circuit is configured to discard the second block of signal waveform data from the signal memory after the cell search circuit processes the second block of signal waveform data.

In Example 59, the subject matter of any one of Examples 53 to 58 can optionally include wherein the first discrete parameter set and the second discrete parameter set each include one or more cell identity and cell timing pairs.

In Example 60, the subject matter of Example 59 can optionally include wherein the cell search circuit is further configured to determine cell identity information and cell timing information of a target cell of the one or more matching cells, and wherein the RF transceiver is configured to transmit or receive the radio signals based on the cell identity information and cell timing information of the target cell.

In Example 61, the subject matter of Example 59 can optionally include wherein the cell search circuit is configured to compare the first discrete parameter set and the second discrete parameter set to identify one or more matching cells by comparing the one or more cell identity and cell timing pairs of the first discrete parameter set to the one or more cell identity and cell timing pairs of the second discrete parameter set to identify one or more matching cell identity and cell timing pairs.

In Example 62, the subject matter of Example 61 can optionally include wherein the one or more matching cell identity and cell timing pairs are included in both the one or more cell identity and cell timing pairs of the first discrete parameter set and the one or more cell identity and cell timing pairs of the second discrete parameter set.

In Example 63, the subject matter of any one of Examples 53 to 62 can optionally include wherein the cell search circuit is configured to process the first block of signal waveform data to extract the first discrete parameter set by performing synchronization sequence detection on the first block of signal waveform data, wherein the first discrete parameter set identifies one or more synchronization sequences transmitted by the one or more first potential cells.

In Example 64, the subject matter of Example 63 can optionally include wherein the cell search circuit is configured to perform synchronization sequence detection on the first block of signal waveform data by performing Primary Synchronization Signal (PSS) or Secondary Synchronization Signal (SSS) detection on the first block of signal waveform data.

In Example 65, the subject matter of any one of Examples 53 to 62 can optionally include wherein the cell search circuit is configured to process the second block of signal waveform data to extract the second discrete parameter set by performing synchronization sequence detection on the second block of signal waveform data, wherein the second discrete parameter set identifies one or more synchronization sequences transmitted by the one or more second potential cells.

In Example 66, the subject matter of any one of Examples 53 to 55 can optionally include wherein the cell search circuit is configured to compare the first discrete parameter set and the second discrete parameter set to identify the one or more matching cells by identifying one or more cells that are represented in both the first discrete parameter set and the second discrete parameter set as the one or more matching cells.

In Example 67, the subject matter of any one of Examples 53 to 55 can optionally include wherein the cell search circuit is configured to compare the first discrete parameter set and the second discrete parameter set to identify the one or more matching cells by identifying the one or matching cells based on one or more of cell identity parameters, cell timing parameters, cell duplex mode parameters, or cell cyclic prefix length parameters.

In Example 68, the subject matter of any one of Examples 53 to 55 can optionally include wherein the cell search circuit is configured to process the first block of signal waveform data to extract the first discrete parameter set by identifying one or more candidate cells that are detectable in the first block of signal waveform data, identifying one or more strongest candidate cells of the one or more candidate cells, and generating the first discrete parameter set with the one or more strongest candidate cells as the one or more first potential cells.

In Example 69, the subject matter of Example 68 can optionally include wherein the cell search circuit is further configured to process the first block of signal waveform data to extract the first discrete parameter set by excluding one or more weak candidate cells from the one or more first potential cells.

In Example 70, the subject matter of any one of Examples 53 to 55 can optionally include wherein the cell search circuit is configured to process the first block of signal waveform data to extract the first discrete parameter set by identify one or more first candidate cells that are detectable in the first block of signal waveform data, exclusively selecting the one or more first potential cells as a smaller subset of the one or more first candidate cells, and storing the first discrete parameter set in a database.

In Example 71, the subject matter of any one of Examples 53 to 55 can optionally include wherein the cell search circuit is configured to process the second block of signal waveform data to extract the second discrete parameter set by identify one or more second candidate cells that are detectable in the second block of signal waveform data, exclusively selecting the one or more second potential cells as a smaller subset of the one or more second candidate cells, and storing the second discrete parameter set in the database.

In Example 72, the subject matter of any one of Examples 53 to 69 can optionally include wherein the cell search circuit is configured to store the first discrete parameter set and the second discrete parameter set in a database.

In Example 73, the subject matter of any one of Examples 53 to 72 can optionally include wherein the cell search circuit is further configured to process one or more additional blocks of signal waveform data to extract one or more additional discrete parameter sets, store each of the one or more additional discrete parameter sets in a database, and identify one or more additional matching cells based on the one or more additional discrete parameter sets, and transmit or receiving radio signals based on the one or more additional matching cells.

In Example 74, the subject matter of any one of Examples 53 to 73 can optionally include wherein the RF transceiver is configured to transmit or receive radio signals based on the one or more matching cells by one or more of transmitting or receiving radio signals with a target cell of the one or more matching cells, establishing a radio connection with the target cell of the one or more matching cells, performing radio measurements on the target cell of the one or more matching cells, or transmitting a report on the target cell to a cellular communication network.

Example 75 is a mobile communication device including a shared result database, an RF transceiver, and a cell search circuit configured to sequentially process each of a plurality of signal waveform data blocks to extract a discrete cell parameter set for each of the plurality of signal waveform data blocks and discard each respective signal waveform data block of the plurality of signal waveform data blocks after extracting the corresponding discrete cell parameter set, store the discrete parameter cell parameter set for each of the plurality of signal waveform data blocks in a shared result database, and identify one or more matching cells based on the shared result database, the RF transceiver configured to transmit or receive radio signals based on the one or more matching cells.

In Example 76, the subject matter of Example 75 can optionally further include a baseband modem, wherein the baseband modem includes the shared result database and the cell search circuit.

In Example 77, the subject matter of Example 75 can optionally include wherein the cell search is further configured to discard each respective signal waveform data block of the plurality of signal waveform data block after extracting the corresponding discrete cell parameter set from the respective signal waveform data block.

In Example 78, the subject matter of Example 77 can optionally further include a signal memory, wherein the cell search circuit is configured to discard each respective signal waveform block of the plurality of signal waveform data blocks after extracting the corresponding discrete cell parameter set by discarding each respective signal waveform block of the plurality of signal waveform data blocks from the signal memory after extracting the corresponding discrete cell parameter set.

In Example 79, the subject matter of Example 78 can optionally include wherein the cell search circuit is configured to discard each respective signal waveform data block of the plurality of signal waveform data blocks from the signal memory after extracting the corresponding discrete cell parameter set by discarding each respective signal waveform data block of the plurality of signal waveform data blocks before processing a subsequent signal waveform block of the plurality of signal waveform blocks to extract the discrete parameter set for the respective signal waveform data block.

In Example 80, the subject matter of Example 78 or 79 can optionally include wherein the cell search circuit is configured to sequentially process each of the plurality of signal waveform data blocks to extract the discrete cell parameter set for each of the plurality of signal waveform data blocks by performing reference signal detection on each of the plurality of signal waveform data blocks to extract the discrete cell parameter set for each of the plurality of blocks of signal waveform data.

In Example 81, the subject matter of Example 80 can optionally include wherein the reference signal detection includes synchronization sequence detection.

In Example 82, the subject matter of Example 80 can optionally include wherein the reference signal detection includes Primary Synchronization Signal (PSS) detection or Secondary Synchronization Signal (SSS) detection.

In Example 83, the subject matter of any one of Examples 78 to 82 can optionally include wherein signal memory is configured to temporarily store each of the plurality of signal waveform data blocks while the cell search circuit sequential processes each individual signal waveform data block.

In Example 84, the subject matter of any one of Examples 75 to 83 can optionally include wherein the cell search circuit is configured to identify the one or more matching cells based on the shared result database by comparing the discrete cell parameter sets for the plurality of signal waveform data blocks stored in the shared result database to identify one or more candidate cells that are detectable in at least a predefined quantity of the plurality of the plurality of signal waveform blocks, and selecting the one or more candidate cells as the one or more matching cells.

In Example 85, the subject matter of Example 84 can optionally include wherein the predefined quantity is a count threshold greater than one.

In Example 86, the subject matter of any one of Examples 75 to 85 can optionally include wherein the cell search circuit is configured to access the shared result database after processing each individual signal waveform data block of the plurality of signal waveform data blocks to identify one or more candidate cells that are detectable in at least a predefined quantity of the plurality of the plurality of signal waveform blocks, and select the one or more candidate cells as matching cells of the one or more matching cells.

In Example 87, the subject matter of any one of Examples 75 to 86 can optionally include wherein each of the discrete cell parameter sets for the plurality of signal waveform data blocks identifies one or more potential cells that are detectable in the respective signal waveform data block of the plurality of signal waveform data blocks.

In Example 88, the subject matter of Example 87 can optionally include wherein each of the discrete cell parameter cells for the plurality of signal waveform data blocks include one or more cell identity parameters and one or more cell timing parameters.

In Example 89, the subject matter of Example 88 can optionally include wherein the cell search circuit is configured to sequentially process each of the plurality of signal waveform data blocks to extract the discrete cell parameter set for each of the plurality of blocks of signal waveform data blocks by performing synchronization sequence detection on each of the plurality of signal waveform data blocks to determine the one or more cell identity parameters and the one or more cell timing parameters.

In Example 90, the subject matter of Example 89 can optionally include wherein the one or more cell identity parameters include one or more Physical Cell IDs (PCIs) and the one or more cell timing parameters include one or more timing locations relative to a detected synchronization sequence.

In Example 91, the subject matter of Example 87 can optionally include wherein the cell search circuit is configured to identify the one or more matching cells based on the shared result database by identifying one or more cell identity and cell timing parameter pairs that are included in at least a predefined quantity of the discrete cell parameter sets for the plurality of signal waveform data blocks, and identifying the one or more matching cells based on the one or more cell identity and cell timing parameter pairs.

In Example 92, the subject matter of any one of Examples 75 to 78 can optionally include wherein the search circuit is configured to identify one or more matching cells based on the shared result database by identifying one or more discrete cell parameters that match according to cell identity information and cell timing information, and identifying the one or more matching cells according to the identified one or more discrete cell parameters.

In Example 93, the subject matter of any one of Examples 75 to 87 can optionally include wherein the discrete cell parameter sets for the plurality of signal waveform data blocks include one or more of cell identity information, cell timing information, cell duplex mode information, or cell cyclic prefix information that correspond to one or more potential cells that are detectable in the respective signal waveform data block.

In Example 94, the subject matter of Example 93 can optionally include wherein the cell search circuit is configured to identify the one or more matching cells based on the shared result database by identifying the matching cells based on cell identity information, cell timing information, cell duplex mode information, or cell cyclic prefix information that appear in at least a predefined quantity of the discrete cell parameter sets for the plurality of signal waveform data blocks.

In Example 95, the subject matter of any one of Examples 75 to 78, can optionally include wherein the search circuit is configured to sequentially process each of the plurality of signal waveform data blocks to extract the discrete cell parameter set for each of the plurality of blocks of signal waveform data by processing each of the plurality of signal waveform data blocks to identify one or more candidate cells present in each of the plurality of signal waveform data blocks, evaluating the one or more candidate cells of each of the plurality of signal waveform data blocks to exclusively identify one or more strong cells from the one or more candidate cells, and extracting the discrete cell parameters for each of the plurality of signal waveform data blocks with the one or more strong cells.

In Example 96, the subject matter of any one of Examples 75 to 78 can optionally include wherein each of the plurality of signal waveform data blocks contains detectable contributions from a plurality of cells, and wherein the cell search circuit is configured to store the discrete cell parameter set for each of the plurality of signal waveform data blocks in the shared result database by exclusively storing cell parameters for one or more strong cells of the plurality of cells in the shared result database as the discrete cell parameter set for each of the plurality of signal waveform data blocks.

In Example 97, the subject matter of any one of Examples 75 to 83 can optionally include wherein the cell search circuit is configured to identify the one or more matching cells based on the shared result database by performing ghost cell filtering to identify the one or more matching cells as real cells based on the shared result database.

In Example 98, the subject matter of any one of Examples 75 to 97 can optionally include wherein the RF transceiver is configured to transmit or receive radio signals based on the one or more matching cells by one or more of transmitting or receiving radio signals with a target cell of the one or more matching cells, establishing a radio connection with the target cell of the one or more matching cells, performing radio measurements on the target cell of the one or more matching cells, or transmitting a report on the target cell to a cellular communication network.

In Example 99, the subject matter of any one of Examples 75 to 98 can optionally include wherein the one or more matching cells include one or more network cells of a $3^{rd}$ Generation Partnership Project (3GPP) radio access network.

In Example 100, the subject matter of any one of Examples 75 to 99 can optionally include wherein the one or more matching cells include one or more Long Term Evolution (LTE) cells, one or more Universal System for Mobile Telecommunications (UMTS) cells, or one or more Global System for Mobile Communication (GSM) cells.

All acronyms defined in the above description additionally hold in all Examples included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A mobile communication device comprising:
a cell search circuit configured to:
process a first block of signal waveform data to extract a first discrete parameter set, wherein the first discrete parameter set identifies one or more first potential cells present in the first block of signal waveform data,
process the second block of signal waveform data to extract a second discrete parameter set, wherein the second discrete parameter set identifies one or more second potential cells present in the second block of signal waveform data, compare the first discrete parameter set and the second discrete parameter set to identify one or more matching cells, and a radio frequency (RF) transceiver configured to transmit or receive radio signals based on the identification of one or more matching cells, wherein the cell search circuit is further configured to discard the first block of signal waveform data before processing the second block of signal waveform data to extract the second discrete parameter set.

2. The mobile communication device of claim 1, further comprising a signal memory, wherein the cell search circuit is configured to discard the first block of signal waveform data by discarding the first block of signal waveform data from the signal memory before processing the second block of signal waveform data to extract the second discrete parameter set.

3. The mobile communication device of claim 1, wherein the first discrete parameter set and the second discrete parameter set each comprise one or more cell identity and cell timing pairs.

4. The mobile communication device of claim 3, wherein the cell search circuit is configured to compare the first discrete parameter set and the second discrete parameter set to identify one or more matching cells by:

comparing the one or more cell identity and cell timing pairs of the first discrete parameter set to the one or more cell identity and cell timing pairs of the second discrete parameter set to identify one or more matching cell identity and cell timing pairs.

5. The mobile communication device of claim 1, wherein the cell search circuit is configured to process the first block of signal waveform data to extract the first discrete parameter set by:

performing synchronization sequence detection on the first block of signal waveform data, wherein the first discrete parameter set identifies one or more synchronization sequences transmitted by the one or more first potential cells.

6. The mobile communication device of claim 1, wherein the cell search circuit is configured to compare the first discrete parameter set and the second discrete parameter set to identify the one or more matching cells by:

identifying one or more cells that are represented in both the first discrete parameter set and the second discrete parameter set as the one or more matching cells.

7. The mobile communication device of claim 1, wherein the cell search circuit is configured to compare the first discrete parameter set and the second discrete parameter set to identify the one or more matching cells by:

identifying the one or matching cells based on one or more of cell identity parameters, cell timing parameters, cell duplex mode parameters, or cell cyclic prefix length parameters.

8. The mobile communication device of claim 1, wherein the cell search circuit is configured to process the first block of signal waveform data to extract the first discrete parameter set by:

identifying one or more candidate cells that are detectable in the first block of signal waveform data;

identifying one or more strongest candidate cells of the one or more candidate cells; and generating the first discrete parameter set with the one or more strongest candidate cells as the one or more first potential cells.

9. The mobile communication device of claim 1, wherein the cell search circuit is configured to process the first block of signal waveform data to extract the first discrete parameter set by:

identify one or more first candidate cells that are detectable in the first block of signal waveform data;

exclusively selecting the one or more first potential cells as a smaller subset of the one or more first candidate cells; and storing the first discrete parameter set in a database.

10. The mobile communication device of claim 1, wherein the RF transceiver is configured to transmit or receive radio signals based on the identification of the one or more matching cells by one or more of:

transmitting or receiving radio signals with a target cell of the one or more matching cells;

establishing a radio connection with the target cell of the one or more matching cells;

performing radio measurements on the target cell of the one or more matching cells; or transmitting a report on the target cell to a cellular communication network.

11. A method for identifying network cells, the method comprising:

processing a first block of signal waveform data to extract a first discrete parameter set, wherein the first discrete parameter set identifies one or more first potential cells present in the first block of signal waveform data;

processing the second block of signal waveform data to extract a second discrete parameter set, wherein the second discrete parameter set identifies one or more second potential cells present in the second block of signal waveform data;

comparing the first discrete parameter set and the second discrete parameter set to identify one or more matching cells; and transmitting or receiving radio signals based on the identification of the one or more matching cells, discarding the first block of signal waveform data before processing the second block of signal waveform data to extract the second discrete parameter set.

12. The method of claim 11, wherein the first discrete parameter set comprises one or more first cell identity and cell timing pairs that identify the one or more first potential cells and the second discrete parameter set comprises one or more second cell identity and cell timing pairs that identify the one or more second potential cells.

13. The method of claim 11, wherein comparing the first discrete parameter set and the second discrete parameter set to identify the one or more matching cells comprises:

performing ghost cell filtering with the first discrete parameter set and the second discrete parameter set to identify the one or more matching cells as real cells.

14. The method of claim 11, wherein processing the first block of signal waveform data to extract the first discrete parameter set comprises:

performing synchronization sequence detection on the first block of signal waveform data, wherein the first discrete parameter set identifies one or more synchronization sequences transmitted by the one or more first potential cells.

15. The method of claim 11, wherein processing the first block of signal waveform data to extract the first discrete parameter set comprises:

identifying one or more candidate cells that are detectable in the first block of signal waveform data;

identifying one or more strongest candidate cells of the one or more candidate cells; and generating the first discrete parameter set with the one or more strongest candidate cells as the one or more first potential cells.

16. The method of claim 11, wherein transmitting or receiving radio signals based on the identification of the one or more matching cells comprises one or more of:

transmitting or receiving radio signals with a target cell of the one or more matching cells;

establishing a radio connection with the target cell of the one or more matching cells;

performing radio measurements on the target cell of the one or more matching cells; or transmitting a report on the target cell to a cellular communication network.

17. A mobile communication device comprising:
a shared result database;
a radio frequency (RF) transceiver; and
a cell search circuit configured to:

sequentially process each of a plurality of signal waveform data blocks to extract a discrete cell parameter set for each of the plurality of signal waveform data blocks and discard each respective signal waveform data block of the plurality of signal waveform data blocks after extracting the corresponding discrete cell parameter set;

store the discrete parameter cell parameter set for each of the plurality of signal waveform data blocks in a shared result database; and identify one or more matching cells based on the shared result database, the RF transceiver configured to transmit or receive radio signals based on the identification of the one or more matching cells.

18. The mobile communication device of claim 17, wherein the cell search is further configured to discard each respective signal waveform data block of the plurality of signal waveform data block after extracting the corresponding discrete cell parameter set from the respective signal waveform data block.

* * * * *